United States Patent
Takahashi et al.

(10) Patent No.: US 11,260,817 B2
(45) Date of Patent: Mar. 1, 2022

(54) AIRBAG DEVICE FOR A DRIVER'S SEAT

(71) Applicant: TOYODA GOSEI CO., LTD., Kiyosu (JP)

(72) Inventors: Hitomi Takahashi, Kiyosu (JP); Koji Kawamura, Kiyosu (JP); Masashi Hotta, Kiyosu (JP); Tsutomu Ishii, Kiyosu (JP); Wataru Miura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/036,077

(22) Filed: Sep. 29, 2020

(65) Prior Publication Data
US 2021/0094498 A1 Apr. 1, 2021

(30) Foreign Application Priority Data
Sep. 30, 2019 (JP) .............................. JP2019-178711

(51) Int. Cl.
*B60R 21/203* (2006.01)
*B60R 21/2338* (2011.01)
(Continued)

(52) U.S. Cl.
CPC .......... *B60R 21/203* (2013.01); *B60R 21/233* (2013.01); *B60R 21/235* (2013.01);
(Continued)

(58) Field of Classification Search
CPC ............... B60R 21/203; B60R 21/233; B60R 21/2338; B60R 21/235;
(Continued)

(56) References Cited

U.S. PATENT DOCUMENTS 5,253,892 A * 10/1993 Satoh ..................... B60R 21/233
280/731
5,358,273 A * 10/1994 Onishi .................. B60R 21/233
280/729
(Continued)

FOREIGN PATENT DOCUMENTS

JP 2008-049858 A 3/2008
JP 2011207414 A * 10/2011
(Continued)

*Primary Examiner* — Laura Freedman
(74) *Attorney, Agent, or Firm* — Posz Law Group, PLC

(57) ABSTRACT

An airbag device includes a steering wheel a rim portion of which has a longer length in a left and right direction than in a front and back direction, and an airbag mounted on a boss section of the steering wheel. An outer shell of the airbag includes a vehicle-side wall that is configured to be supported by an upper surface of the rim portion when deployed, and a driver-side wall a central region of which is configured to deploy generally vertically for receiving the driver. The airbag as deployed includes, in a rear portion of the vehicle-side wall, a locking inflatable portion that protrudes downward from a vicinity of the upper surface of the rim portion of the steering wheel to be locked by a rear surface of the rim portion and prevent a front portion of the airbag from slipping forward.

9 Claims, 19 Drawing Sheets

US 11,260,817 B2
Page 2

(51) Int. Cl.
*B60R 21/233* (2006.01)
*B60R 21/235* (2006.01)

(52) U.S. Cl.
CPC ............ *B60R 21/2338* (2013.01); *B60R 2021/23382* (2013.01); *B60R 2021/23386* (2013.01); *B60R 2021/23509* (2013.01); *B60R 2021/23538* (2013.01)

(58) Field of Classification Search
CPC ........ B60R 2021/23308; B60R 2021/23324; B60R 2021/23382; B60R 2021/23386; B60R 2021/23509; B60R 2021/23538; B60R 2021/23576
See application file for complete search history.

(56) References Cited

U.S. PATENT DOCUMENTS

| | | | | |
|---|---|---|---|---|
| 5,529,337 A * | | 6/1996 | Takeda | B60R 21/233 280/729 |
| 5,605,350 A * | | 2/1997 | Bates | B60R 21/203 280/731 |
| 7,090,248 B2 * | | 8/2006 | Jenkins | B60R 21/201 280/728.1 |
| 7,441,799 B2 * | | 10/2008 | Enders | B60R 21/203 280/731 |
| 7,669,890 B2 * | | 3/2010 | Bito | B60R 21/203 280/731 |
| 7,823,920 B1 * | | 11/2010 | Burghardt | B60R 21/203 280/736 |
| 8,140,227 B2 * | | 3/2012 | Imamura | B60R 21/0134 701/45 |
| 8,186,713 B2 * | | 5/2012 | Fischer | B60R 21/276 280/739 |
| 8,899,618 B2 * | | 12/2014 | Eckert | B60R 21/231 280/731 |
| 9,126,563 B2 * | | 9/2015 | Piccard | B60R 21/239 |
| 9,321,421 B2 * | | 4/2016 | Fukawatase | B60R 21/2346 |
| 9,758,121 B2 * | | 9/2017 | Paxton | B60R 21/2338 |
| 10,919,483 B2 * | | 2/2021 | Hotta | B60R 21/216 |
| 10,933,837 B2 * | | 3/2021 | Kadam | B60R 21/203 |
| 11,066,031 B2 * | | 7/2021 | Choi | B60R 21/2035 |
| 2006/0113774 A1 * | | 6/2006 | Hirose | B60R 21/2338 280/731 |
| 2006/0197320 A1 * | | 9/2006 | Abe | B60R 21/233 280/729 |
| 2006/0232050 A1 * | | 10/2006 | Kumagai | B60R 21/231 280/730.1 |
| 2008/0048420 A1 | | 2/2008 | Washino | |
| 2013/0001936 A1 | | 1/2013 | Nagasawa et al. | |
| 2017/0355341 A1 * | | 12/2017 | Keyser | B60R 21/203 |
| 2018/0086298 A1 * | | 3/2018 | Nakanishi | B60R 21/233 |
| 2018/0361980 A1 * | | 12/2018 | Schneider | B60R 21/203 |
| 2020/0307486 A1 * | | 10/2020 | Ishii | B60R 21/237 |
| 2021/0300290 A1 * | | 9/2021 | Ishii | B60R 21/217 |

FOREIGN PATENT DOCUMENTS

| | | |
|---|---|---|
| JP | 2013-014178 A | 1/2013 |
| JP | 2014231328 A * | 12/2014 |
| JP | 2018-122844 A | 8/2018 |
| JP | 2019038399 A * | 3/2019 |
| JP | 2020163999 A * | 10/2020 |

* cited by examiner

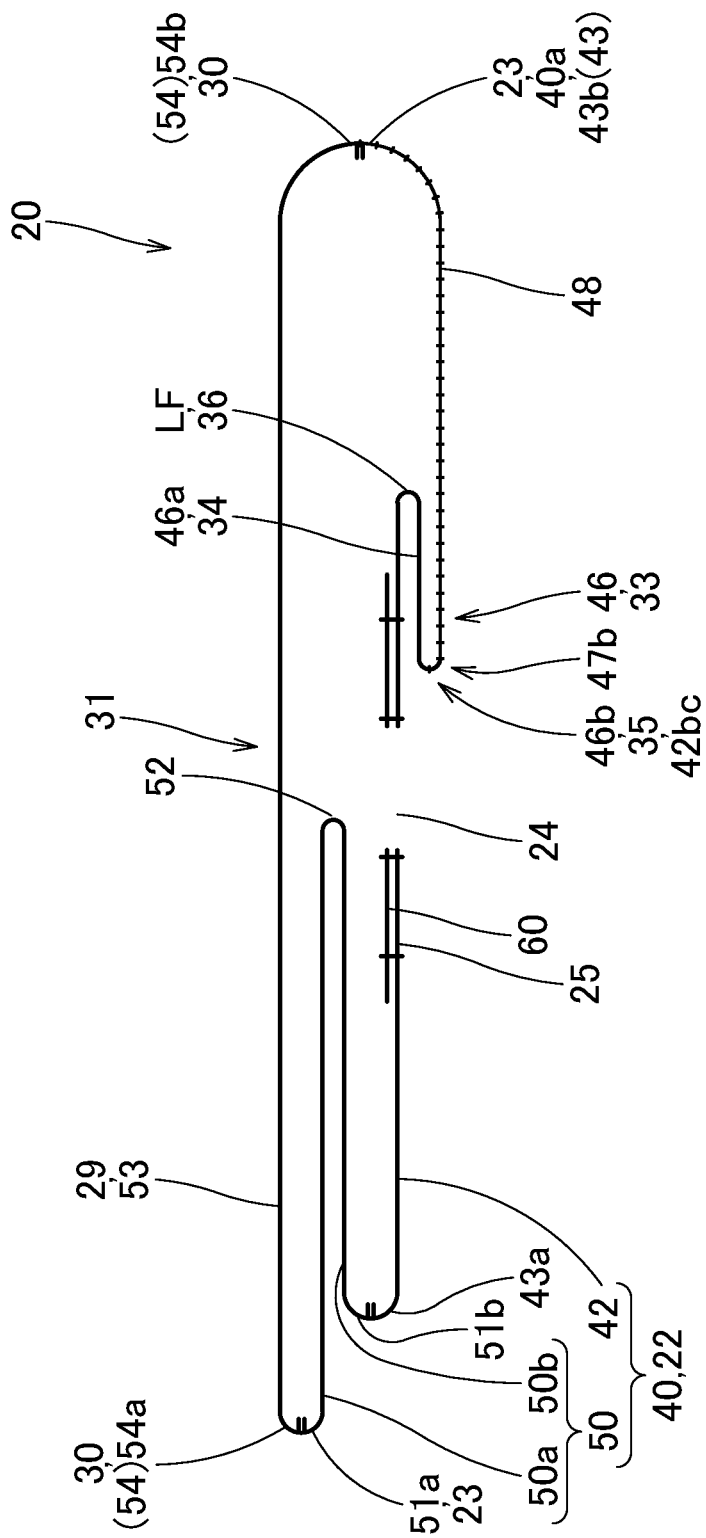

FIG. 16
(A)
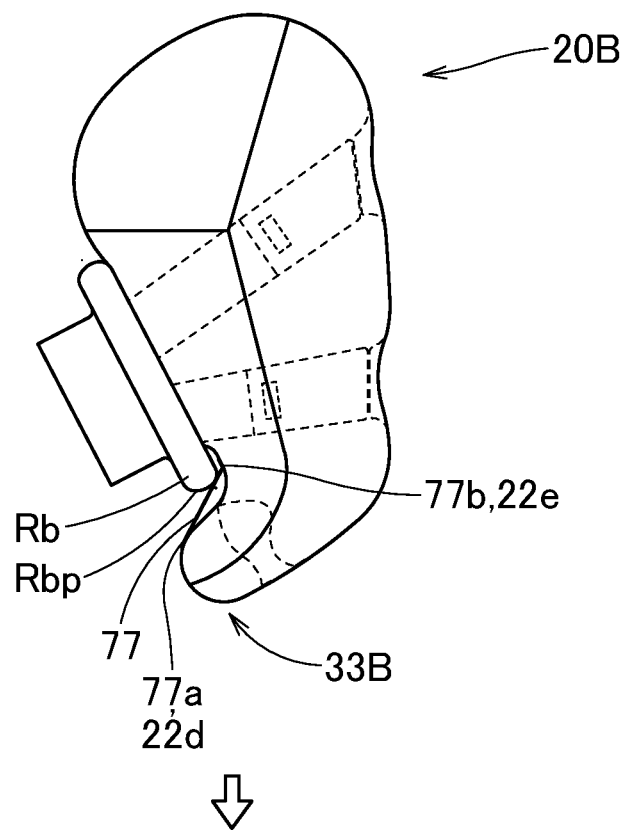
(B)
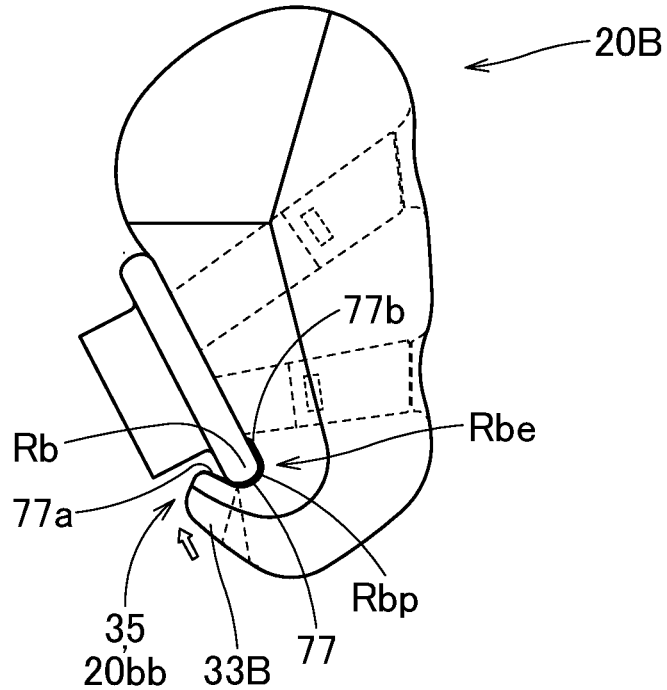

AIRBAG DEVICE FOR A DRIVER'S SEAT

CROSS REFERENCE TO RELATED APPLICATIONS

The Present application claims priority from Japanese Patent Application No. 2019-178711 of Takahashi et al., filed on Sep. 30, 2019, the entire disclosure of which is incorporated herein by reference.

BACKGROUND

1. Technical Field

The present disclosure relates to an airbag device for a driver's seat that is adapted to be mounted on a boss section located in a vicinity of a central axis of rotation of a steering wheel. More particularly, the present disclosure relates to an airbag device for a driver's seat that is suitable for a steering wheel a size of which in a front and back direction is smaller than that in a left and right direction.

2. Description of Related Art

JP 2018-122844 A discloses a known airbag device for a driver's seat that is adapted to be mounted on a steering wheel a size of which in a front and back direction is smaller than that in a left and right direction. Such a steering wheel can be called an odd-shaped steering wheel that includes an odd-shaped, by way of example, a generally square annular shaped, rim portion which is different from a normal annular rim portion. An airbag of the above patent literature includes a vehicle-side wall which is supported by an upper surface of the rim portion at airbag deployment and a driver-side wall for receiving a driver, and the vehicle-side wall includes a front support surface that is brought into contact with a front surface of the rim portion and a rear support surface that is brought into contact with a rear surface of the rim portion, at airbag deployment. When this airbag is deployed, the front support surface is brought into contact with the front surface of the rim portion, so that a front portion of the driver-side wall is prevented from collapsing forward though the steering wheel is odd shaped with a smaller width in the front and back direction than in the left and right direction, thus the driver-side wall is able to receive the driver smoothly with the front portion. In the meantime, the rear support surface of the airbag is brought into contact with the rear surface of the rim portion, so that a rear portion of the driver-side wall is prevented from collapsing forward though the steering wheel is odd shaped with a smaller width in the front and back direction than in the left and right direction, thus the driver-side wall is able to receive the driver smoothly with the rear portion.

Generally, in an airbag mounted on an odd-shaped steering wheel, in order to deploy a driver-side wall wide enough for receiving the driver from the head to a vicinity of the thorax, it would be preferable that the airbag as deployed on the rim portion of the steering wheel have a greater thickness in the front portion than in the rear portion so that a vicinity of the center of the driver-side wall is deployed generally vertically. However, even if the airbag thus configured has the front support surface and the rear support surface that respectively contact with the front surface and rear surface of the rim portion at airbag deployment, the airbag still may slip forward. Specifically, if the vehicle-side wall slips forward along the upper surface of the rim portion, the front support surface moves forward and gets separated from the front surface of the rim portion, the rear support surface slips upward along the rear surface of the rim portion, which possibly reveals a rear portion of the rim portion of the steering wheel. In that case, an abdomen of the driver may be directly engaged with the rear portion of the rim portion. If the airbag slips forward with the driver-side wall contacting with a chin of the driver, the airbag may turn the head of the occupant backward and damage his neck.

SUMMARY

An exemplary embodiment of the disclosure relates to an airbag device for a driver's seat, including a steering wheel that is adapted to be mounted on a vehicle in such a manner that the central axis of rotation extends obliquely rearwardly and upwardly, and an airbag device. The steering wheel includes a rim portion configured for gripping, the rim portion being disposed in an outer circumferential edge of the steering wheel apart from the central axis of rotation, the rim portion as viewed from above having such a shape that a length in a left and right direction is greater than a length in a front and back direction, and a boss section that is disposed in a vicinity of the central axis of rotation. The airbag device is mounted on the boss section of the steering wheel for protecting a driver, the airbag device including an airbag that is configured to be deployed from the boss section and supported by an upper surface of the rim portion. An outer shell of the airbag includes a vehicle-side wall that is configured to be supported by the upper surface of the rim portion when deployed, the vehicle-side wall being greater than the rim portion in outside dimension in the front and back direction and in the left and right direction, the vehicle-side wall including, in a vicinity of the center, an inlet port for introducing an inflation gas, and a mounting seat which is disposed in a periphery of the inlet port and by which the airbag is mounted on the boss section; and a driver-side wall for receiving the driver, the driver-side wall extending from an outer circumferential edge of the vehicle-side wall and covering the inlet port. The airbag is configured to be inflated in such a fashion that the front portion above the rim portion has a greater thickness than the rear portion in order that a central region of the driver-side wall is deployed generally vertically. The airbag as deployed further includes, in a rear portion of the vehicle-side wall, a locking inflatable portion that protrudes downward from a vicinity of the upper surface of the rim portion to be locked by a rear surface of the rim portion and prevent the front portion of the airbag from slipping forward.

BRIEF DESCRIPTION OF DRAWINGS

FIG. 7 is a sectional view taken along line VII-VII of FIG. 6B.

FIG. 16 depicts a deployment process of the airbag device in accordance with the third embodiment from the side.

DETAILED DESCRIPTION

Exemplary embodiments of the invention are described below with reference to the accompanying drawings. However, the invention is not limited to the embodiments disclosed herein. All modifications within the appended claims and equivalents relative thereto are intended to be encompassed in the scope of the claims.

Figure 1:
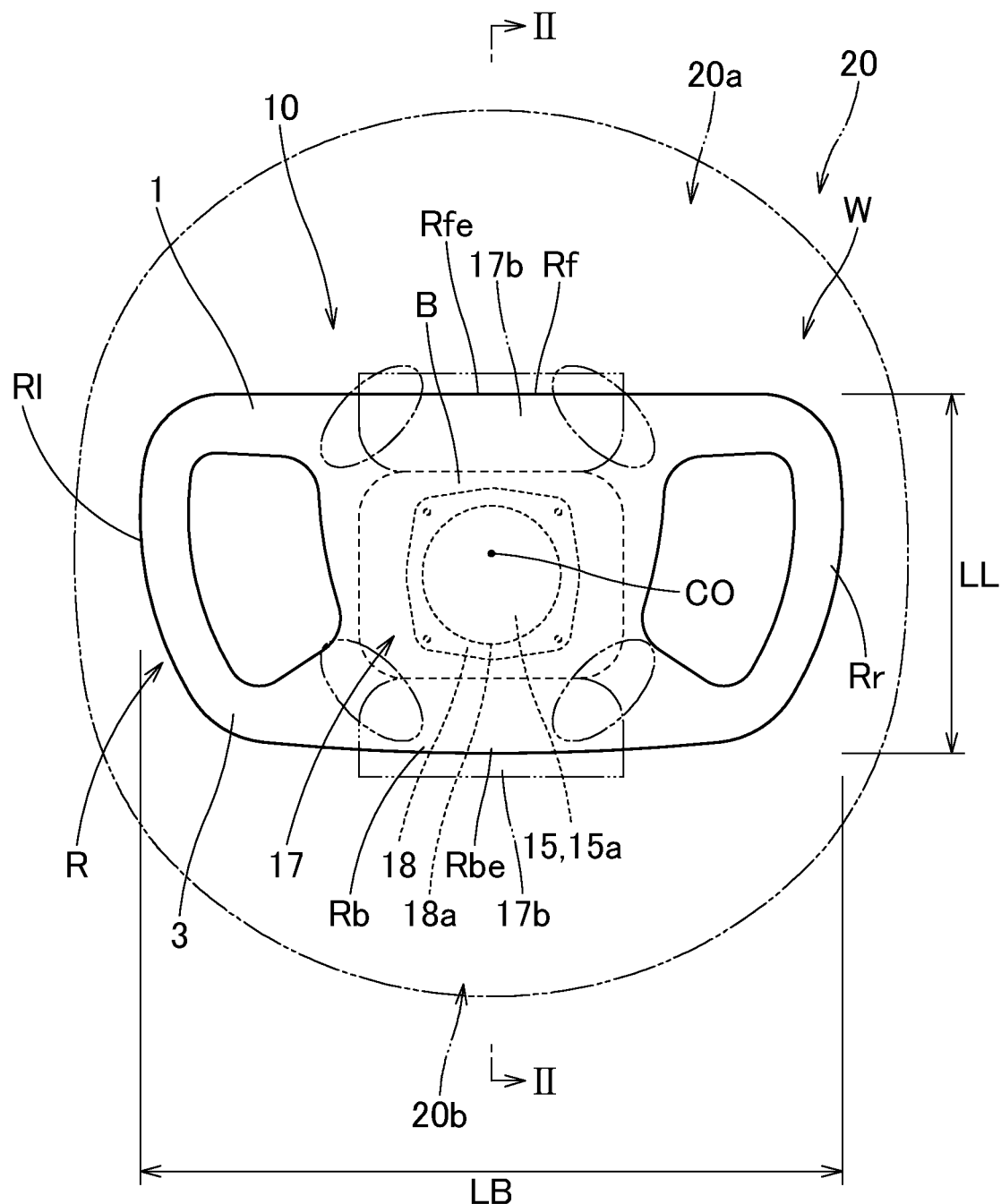
FIG. 1 is a schematic plan view of a steering wheel equipped with an airbag device for a driver's seat in accordance with a first exemplary embodiment.
Figure 2:
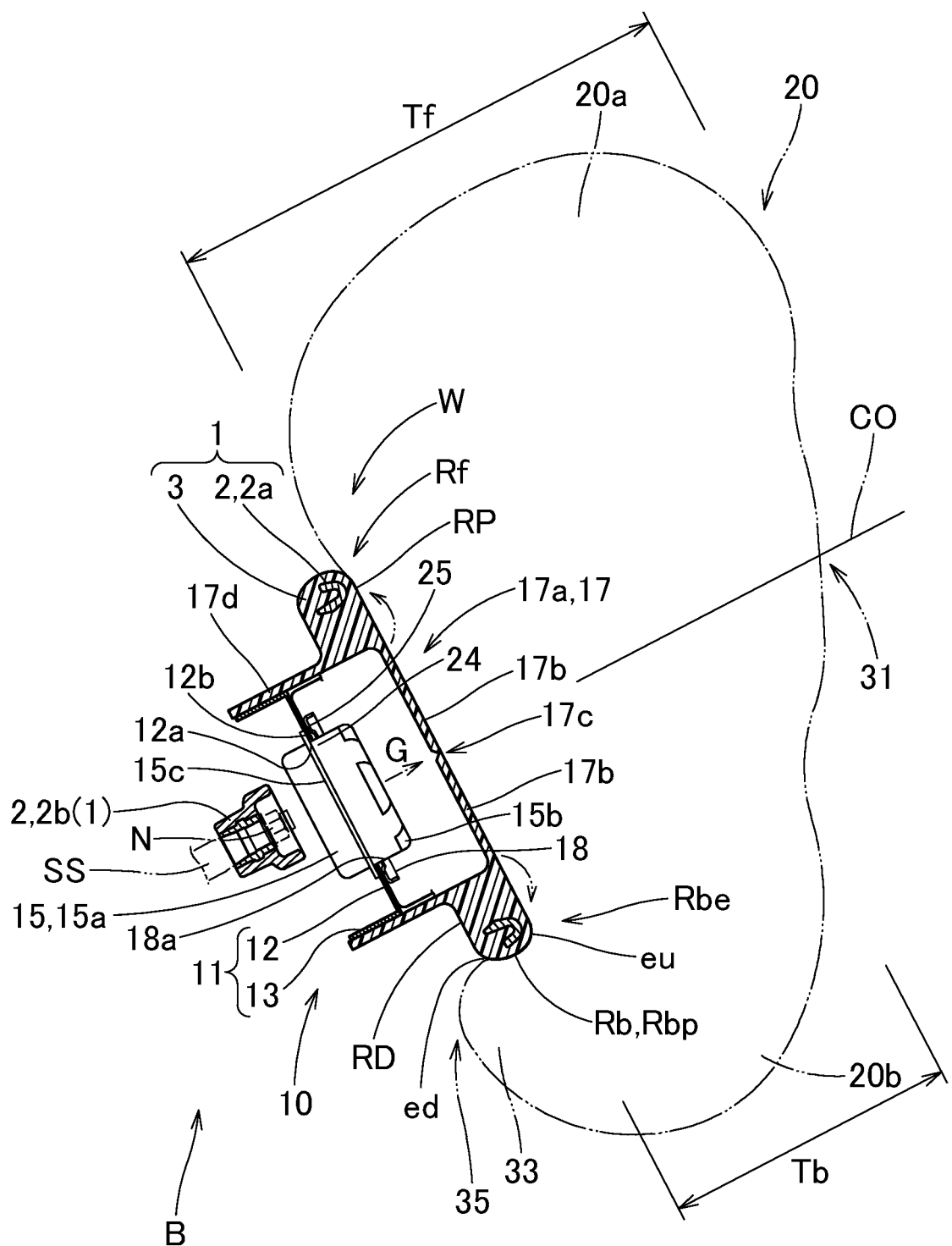
FIG. 2 is a schematic vertical sectional view taken along line II-II of FIG. 1.

Referring to FIGS. 1 and 2, an airbag device 10 for a driver's seat in accordance with a first exemplary embodiment is mounted on a boss section B of a steering wheel W of a vehicle. The boss section B is located in a vicinity of a central axis CO of rotation of the steering wheel W which extends rearwardly and upwardly. The steering wheel W includes a rim portion R for gripping for steering operation in the outer circumferential edge apart from the central axis CO of rotation. The rim portion R is so disposed that a rear portion Rb is located farther downward than a front portion Rf in an upper surface RP for easy steering. As viewed from above, the rim portion R has a generally square annular shape (i.e. an odd shape) that a length LB in a left and right direction is greater than a length LL in a front and back direction. More specifically, a left portion Rl and a right portion Rr of the rim portion R each have a rod shape extending along the front and back direction, and left end regions and right end regions of the front portion Rf and rear portion Rb also have a rod shape. A central portion in the left and right direction of each of the front portion Rf and rear portion Rb is formed into a board shape connected with the boss section B and having a rounded leading end.

The steering wheel W includes a wheel body 1 which includes the rim portion R and the boss section B, and the airbag device 10 disposed on top of the boss section B.

In this specification, unless otherwise specified, up-down, left-right, and front-back directions of the airbag device 10, an airbag 20, the steering wheel W and so on are based on the steering wheel W which is nut N fixed and connected to a steering shaft SS (FIG. 2) of the vehicle and steered straight ahead. Specifically, the up and down direction corresponds to an up and down direction extending along an axial direction of the steering shaft SS. The left and right direction corresponds to a left and right direction of the vehicle which is orthogonal to the axial direction of the steering shaft SS. The front and rear direction corresponds to a front and rear direction of the vehicle which is orthogonal to the axial direction of the steering shaft SS.

The central axis CO of rotation of the steering wheel W is coincident with a shaft center of the steering shaft SS. The inclination of the central axis CO of rotation is based on a horizontal direction of the vehicle.

Referring to FIG. 2, the wheel body 1 includes a skeleton 2 of such a shape that the rim portion R and the boss section B are interconnected, and a cladding layer 3 that covers the skeleton 2 at the rim portion R. The cladding layer 3 is fabricated from urethane or the like. The skeleton 2 includes a rim-core portion 2a which forms the rim portion R, a boss-core portion 2b which forms the boss section B and is connected with the steering shaft SS. The rim-core portion 2a and boss-core portion 2b are interconnected by a not-shown connecting portion. The cladding layer 3 is also disposed in a region above the boss section B and functions as a cover 17 of the airbag device 10.

The airbag device 10 includes an airbag 20 in a folded configuration, an inflator 15 for feeding the airbag 20 with an inflation gas, an airbag cover 17 which covers the airbag 20 and is disposed on top of the boss section B of the steering wheel W, and a bag holder 11 which is made of metal and holds and houses the airbag 20 and inflator 15. The airbag cover 17 is fabricated from synthetic resin. The bag holder 11 is coupled to the not-shown connecting portion of the skeleton 2 adjoining the boss-core portion 2b, through the use of not-shown brackets.

A retainer 18 made of sheet metal is disposed on a bottom of and inside of the airbag 20 for mounting the airbag 20 on the bag holder 11. The retainer 18 is formed into a square annular shape provided with downward-protruding bolts (not shown) at the four corners. The retainer 18 includes, at the center, an opening 18a for receiving a later-described body 15a of the inflator 15.

The inflator 15 includes a body 15a which has a pot-like shape and a flange 15c which protrudes from an outer circumference of the body 15a in a square annular shape. The flange 15c is provided with not-shown through holes for receiving the not-shown bolts of the retainer 18. The body 15a includes a plurality of gas discharge ports 15b for emitting an inflation gas G in the portion disposed farther upward than the flange 15c.

The airbag cover 17 is composed of an extended region of the cladding layer 3. The airbag cover 17 includes a ceiling wall 17a which covers the airbag 20 as folded and stored from above and a side wall 17d which extends downwardly from an underside of the ceiling wall 17a in a tubular shape and covers the circumference of the airbag 20. The ceiling wall 17a includes two doors 17b which are configured to open forward and rearward when pushed by the airbag 20 as inflated. The doors 17b have hinge portions at the front and rear edges, and a thinned breakable portion 17c is formed around the doors 17b generally in a H shape as viewed from above. The side wall 17d of the airbag cover 17 is connected with a later-described supporting wall 13 of the bag holder 11 through the use of not-shown rivets or the like.

The bag holder 11 is made of sheet metal. The bag holder 11 holds the airbag 20 and the inflator 15, and mounts the airbag device 10 on the wheel body 1 of the steering wheel W with the use of not-shown, at least one connecting bracket. The bag holder 11 includes a base plate 12 and a supporting wall 13 which protrudes upwardly and downwardly from the outer circumferential edge of the base plate 12 for supporting the side wall 17d of the airbag cover 17. The base plate 12 is provided with, at the center, a generally round insert hole 12a for receiving the inflator body 15a from below and communicating with a later-described inlet port 24 (FIGS. 3 and 4) of the airbag 20. In a periphery of the insert hole 12a, there are disposed a plurality of through holes for receiving the not-shown bolts of the retainer 18. This peripheral region of the insert hole 12a provided with the through holes for receiving the bolts serves as a mounting seat 12b on which the airbag 20 and inflator 15 are mounted with the use of the retainer 18.

Figure 3:
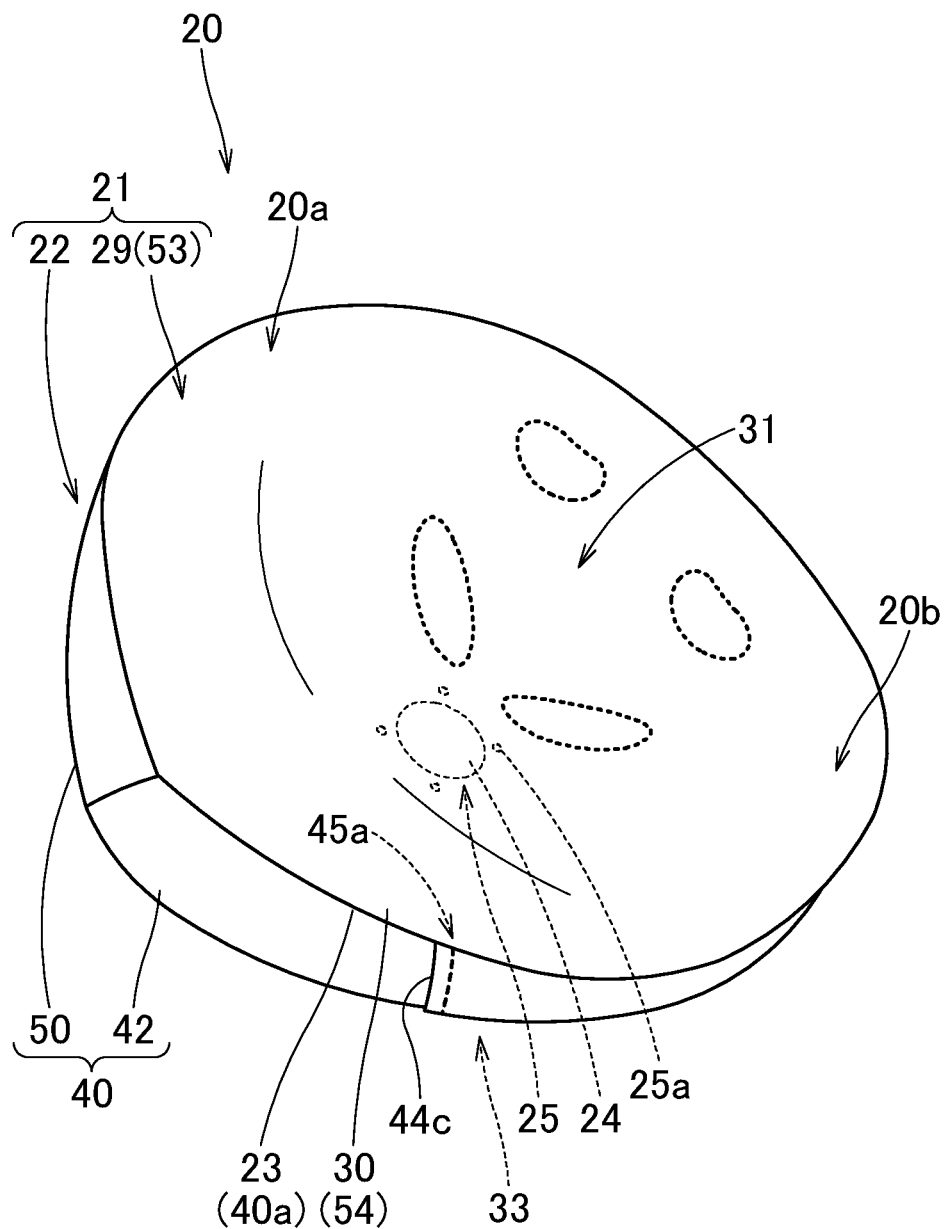
FIG. 3 is a schematic perspective view of an airbag of the airbag device of FIG. 1 as inflated by itself and viewed from the side of a driver-side wall.
Figure 4:
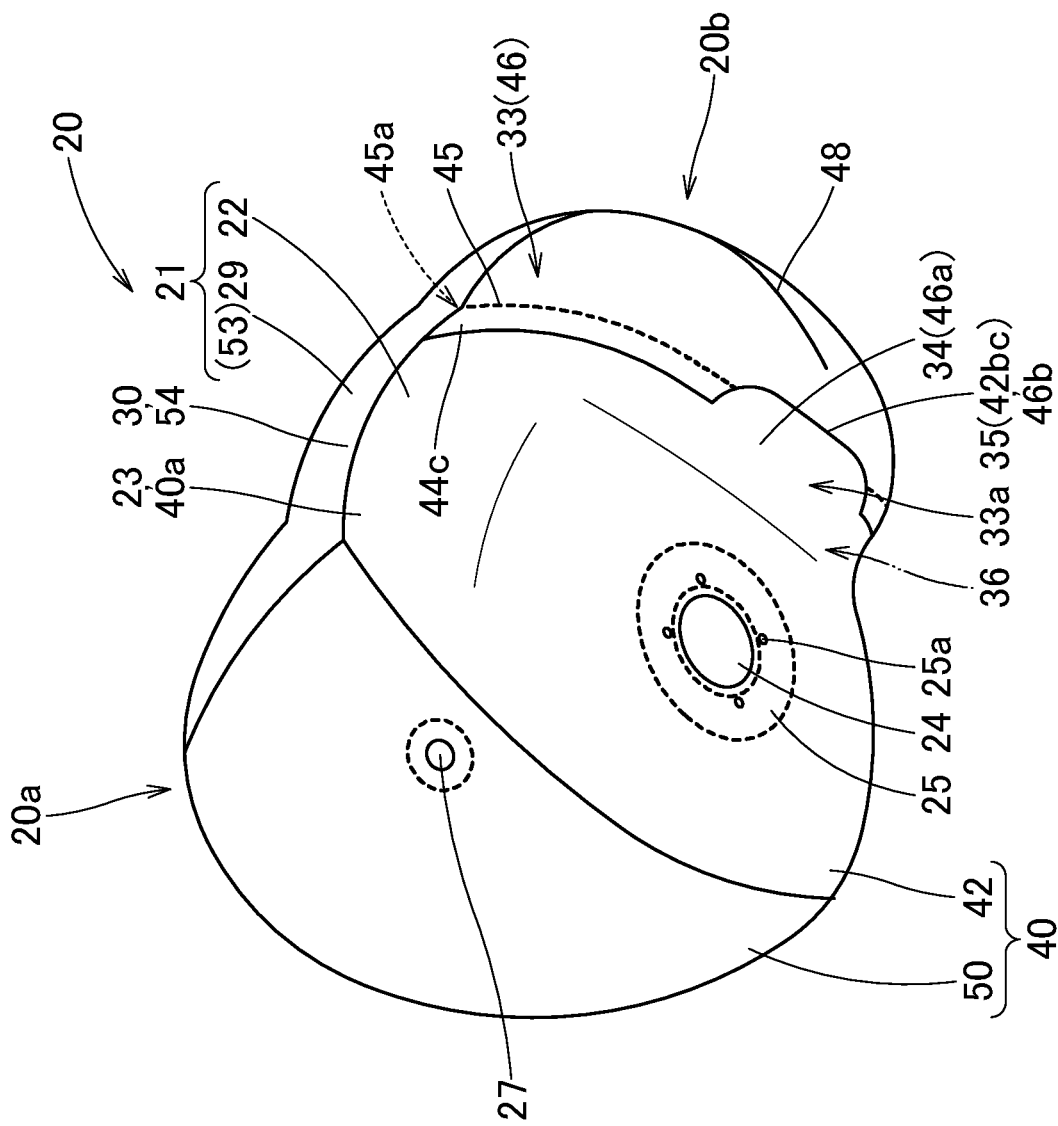
FIG. 4 is a schematic perspective view of the airbag of FIG. 3 as inflated by itself and viewed from the side of a vehicle-side wall.
Figure 8:
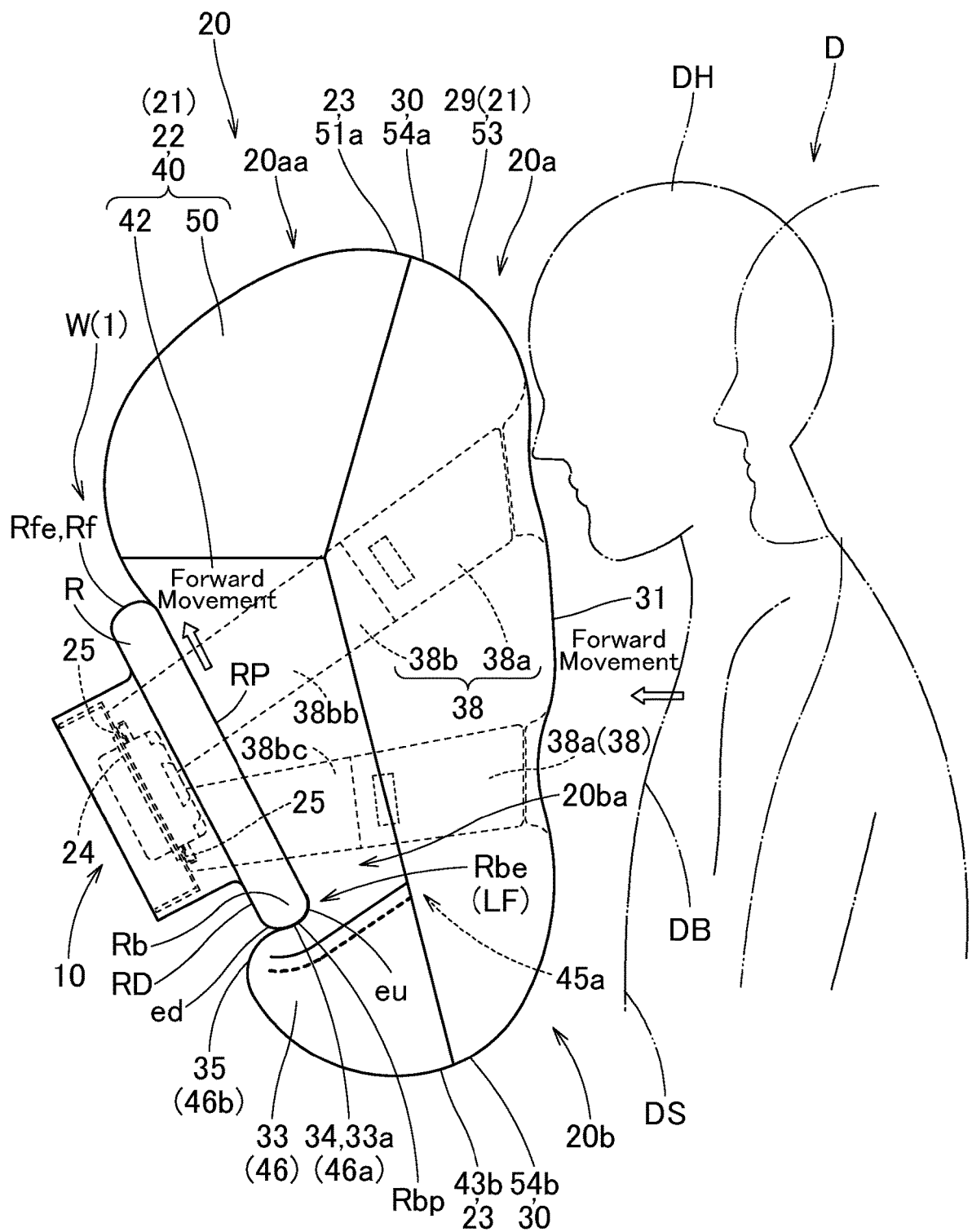
FIG. 8 is a side view of the airbag device in accordance with the first exemplary embodiment at airbag deployment.

As can be seen in FIGS. 1 and 2 (with dashed-and-double-dotted lines), 3, 4 and 8, the airbag 20 is configured inflatable into a generally circular board shape a front portion 20a of which has a greater thickness Tf than a thickness Tb of a rear portion 20b. As shown in FIGS. 3, 4 and 8, an outer shell 21 of the airbag 20 includes a vehicle-side wall 22 which is supported by an upper surface RP of the rim portion R of the steering wheel W at airbag deployment, and a driver-side wall 29 whose outer circumferential edge 30 is continuous with an outer circumferential edge 23 of the vehicle-side wall 22, and which is opposed to the vehicle-side wall 22 and covers the inlet port 24. The vehicle-side wall 22 includes an inlet port 24 of an inflation gas G and a mounting seat 25 disposed around the inlet port 24, generally at the center, and has an outside dimension greater than the rim portion R of the steering wheel W in a front and back direction and in a left and right direction. The driver-side wall 29 has a generally circular shape.

A peripheral portion of the inlet port 24 in the vehicle-side wall 22 serves as a mounting seat 25 of the bag holder 11. The mounting seat 25 is provided with four through holes 25a formed radially about the inlet port 24 for receiving the not-shown bolts of the retainer 18, as can be seen in FIGS. 3 and 4. The mounting seat 25 is a generally square annular portion which is fixed to the mounting seat 12b of the bag holder 11 with its inner side abutted against an underside of the retainer 18.

As can be seen in FIGS. 2 to 4, the airbag 20 as inflated includes, in a rear region of the vehicle-side wall 22, a locking inflatable portion 33 which protrudes downwardly. As shown in FIG. 8, at airbag deployment, the locking inflatable portion 33 protrudes downward from a vicinity of the upper surface RP of the rim portion R so as to catch on and be locked by a rear surface Rbp of the rim portion R and prevent the front portion 20a of the airbag 20 from slipping or moving forward.

To describe more specifically, in order to be brought into contact with the upper surface RP to the rear surface Rbp of a rear end portion Rbe of the rim portion R, the locking inflatable portion 33 of the airbag 20 in the first exemplary embodiment is formed into such a halved circular cone that a bottom plane faces upward and a division surface, which is taken along the height of the cone, is disposed in a front side 33a. A locking surface 34 that extends from an upper edge eu to a lower edge ed of the rear surface Rbp of the rim portion R to be locked by the lower edge ed is disposed in the front side 33a of the locking inflatable portion 33.

The driver-side wall 29 is designed to be deployed generally vertically and receive the head DH and thoracic region DB of the driver D with its central portion, namely, a receiving plane 31.

Figure 5:
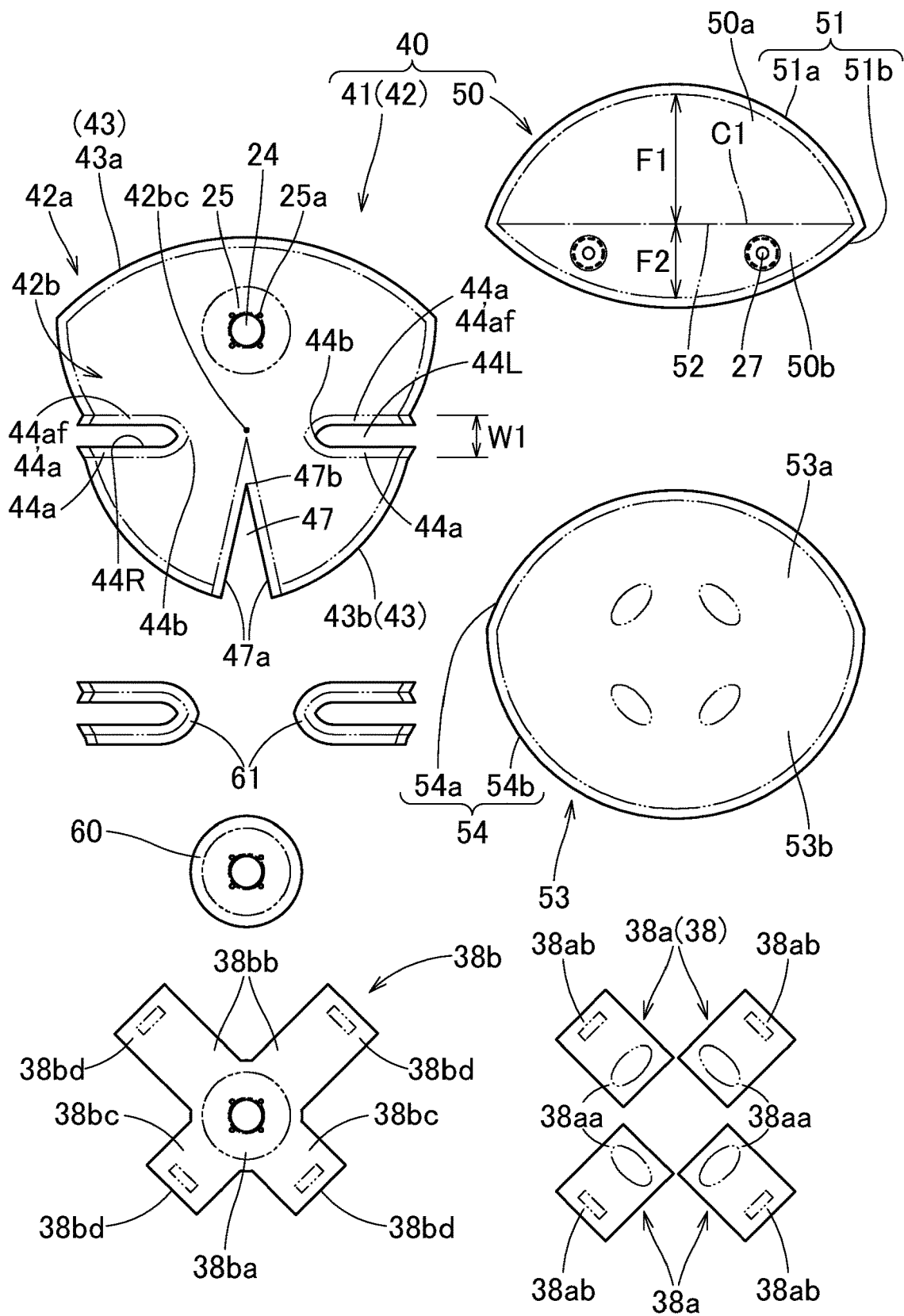
FIG. 5 depicts components of the airbag of FIG. 3 in plan.

The airbag 20 internally includes a tether 38 that makes the front portion 20a of the airbag 20 thicker than the rear portion 20b when inflated. The tether 38 is composed of four upper portions 38a each of which is joined to the driver-side wall 29 by the upper end 38aa, and a lower portion 38b which is joined to a vicinity of the mounting seat 25 of the vehicle-side wall 22, as can be seen in FIGS. 5 and 8. The lower portion 38b includes a central portion 38ba which is joined to the peripheral portion of the inlet port 24 and two each tongues 38bb and 38bc which extend radially from the central portion 38ba. The tongues 38bb in the front side are longer than the tongues 38bc in the rear side. Upper ends 38bd of the tongues 38bb, 38bc are joined with lower ends 38ab of the upper portions 38a, thereby forming the tether 38. Since the tongues 38bb in the front side of the lower portion 38b are longer than the tongues 38bc in the rear side, the front portion 20a of the airbag 20 as inflated will be thicker than the rear portion 20b.

Referring to FIG. 5, the outer shell 21 of the airbag 20 is composed of a driver-side base cloth 53 for forming the driver-side wall 29, and a vehicle-side base cloth 40 for forming the vehicle-side wall 22. The vehicle-side base cloth 40 includes a front-side component 50 disposed in the front side and a rear-side component 42 which is disposed at the rear of the front-side component 50 and provided with a region for forming the mounting seat 25. The front-side component 50 is provided for making the thickness Tf of the front portion 20a of the airbag 20 greater than that of the rear portion 20b when the airbag 20 is inflated. These components or base cloths 42, 50, 53 are composed of a fabric of such synthetic resin as polyamide, polyester or the like.

The driver-side base cloth 53 has a generally circular shape which includes a front circular segment portion 53a and a rear circular segment portion 53b which face away from each other. In this specific embodiment, a protruding amount in a front and back direction of the rear portion 53b is greater than that of the front portion 53a.

Figure 6A:
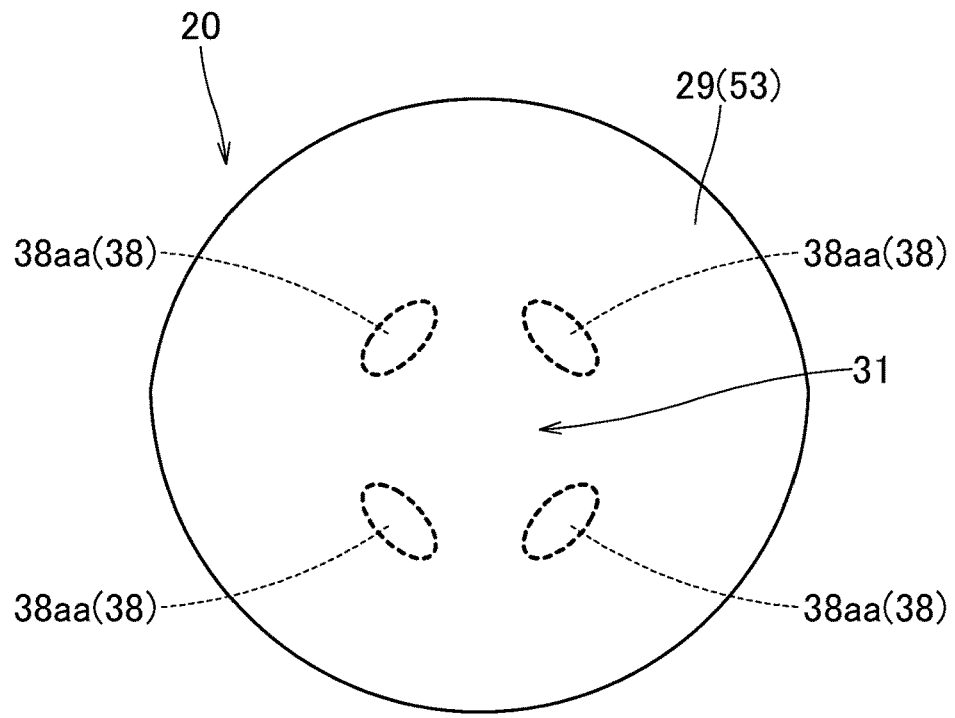
FIG. 6A is a plan view of the airbag of FIG. 3 as flatly developed.
Figure 6B:
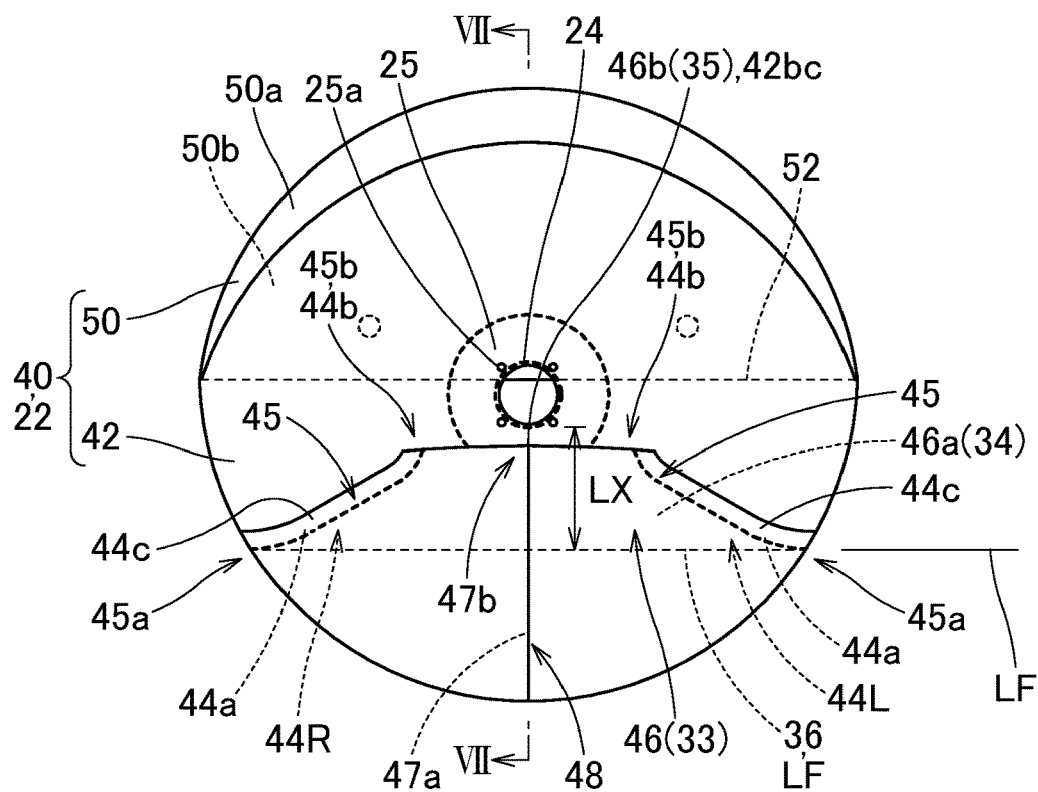
FIG. 6B is a bottom view of the airbag of FIG. 3 as flatly developed.

As can be seen in FIGS. 5 and 6B, the rear-side component 42 of the vehicle-side base cloth 40 has a generally circular shape when developed. The rear-side component 42 is composed of a preparatory base cloth 41 depicted in FIG. 5. The preparatory base cloth 41 includes a rear cut-out portion 47 which is triangular and extends forward from the rear edge 43b, and two U-shaped cut-out portions 44L, 44R which extend towards the center along a left and right direction from left and right edges of a region farther rearward than the inlet port 24. Opposite edges 47a of the rear cut-out portion 47 are sewn together to the front end 47b with a seam 48, and opposite edges 44a of each of the U-shaped cut-out portions 44L, 44R are sewn together to the leading end 44b with a seam 45 such that a seam allowance 44c appears on the outer surface, thereby providing the rear-side component 42 depicted in FIG. 6B.

Referring to FIGS. 5, 6B and 8, in the rear-side component 42 of the vehicle-side base cloth 40, a front edge 44af of the opposite edges 44a of each of the U-shaped cut-out portions 44L, 44R in the preparatory base cloth 41 is so positioned that a straight line LF that connects outer ends 45a of the seams 45 of the U-shaped cut-out portions 44L, 44R is located at the rear end Rbe of the rim portion R of the steering wheel W when the airbag 20 as mounted on the boss section B is deployed. In other words, the U-shaped cut-out portions 44L, 44R are so configured that a distance LX (FIG. 6B) between the straight line LF connecting the outer edges 45a of the seams 45 and the mounting seat 25 or inlet port 24 corresponds to a substantial distance between the mounting seat 25 of the airbag 20 as deployed and the rear end Rbe of the rim portion R of the steering wheel W.

In the rear-side component 42 thus configured, the seams 45 closing the left and right U-shaped cut-out portions 44L, 44R form a raised portion 46 which is raised by an amount of opening width W1 of the cut-out portions 44L, 44R and extends in the left and right direction. More specifically, regions in vicinities of the outer edges 45a of the seams 45 are pulled rearward by the seam 48 of the rear cut-out portion 47, whereas a central region 42bc disposed between the left and right U-shaped cut-out portions 44L, 44R protrudes forward, thus forming the raised portion 46. This enables the central region 42bc disposed between the left and right U-shaped cut-out portions 44L, 44R to be folded towards the mounting seat 25 on a crease 36 which corresponds to the straight line LF that connects the outer ends 45a of the seams 45 of the U-shaped cut-out portions 44L, 44R, as can be seen in FIGS. 6B and 7. When the airbag 20 is inflated, a leading end 35 of the central region 42bc laid on a vicinity of the mounting seat 25 is deployed towards the inlet port 24 or mounting seat 25 underneath the rim portion R of the steering wheel W, as can be seen in FIG. 2 (dashed-and-double-dotted lines) and FIG. 4, thus the central region 42bc, i.e. the raised portion 46, forms the locking inflatable portion 33. A surface 46a (FIG. 8) of the raised portion 46 facing towards the mounting seat 25 forms a front surface 33a of the locking inflatable portion 33, i.e. the locking surface 34, that catches on and is locked by the rear end Rbe of the rim portion R.

The rear-side component 42 provided with the seams 45, 48 includes a front portion 42a which is located father forward than the mounting seat 25 and has a circular segment shape, and a rear portion 42b which has a circular segment shape and includes the mounting seat 25. An outer circumferential edge 43 of the rear-side component 42 has a circular arc portion 43a in the front portion 42a and a circular arc portion 43b in the rear portion 42b. The circular arc portion 43a in the front portion 42a is joined (sewn) to a later-described circular arc portion 51b of the front-side component 50, and the circular arc portion 43b in the rear portion 42b is joined (sewn) to a rear circular arc portion 54b of the rear portion 53b in the driver-side base cloth 53.

The front-side component 50 has a generally circular shape which includes a front circular segment portion 50a and a rear circular segment portion 50b which face away from each other. An outer circumferential edge 51 of the front-side component 50 has a front circular arc portion 51a in the front portion 50a and a circular arc portion 51b in the rear portion 50b. In the airbag 20 as deployed, the circular arc portion 51a is located in the front side and joined (sewn) together with a front circular arc portion 54a in the outer circumferential edge 54 of the driver-side base cloth 53. Thus, the circular arc portion 51a is identical in shape to the circular arc portion 54a. The rear circular arc portion 51b forms a rear edge of the front-side component 50 in the airbag 20 as deployed, and is joined (sewn) together with the front circular arc portion 43a in the outer circumferential edge 43 of the rear-side component 42, as described above. Thus, the circular arc portion 51b is identical in shape to the circular arc portion 43a.

The front-side component 50, the rear-side component 42 and driver-side base cloth 53 have an identical width in the left and right direction. The front portion 50a is greater in width in the front and back direction than the rear portion 50b. More specifically, a width F1 in the front and rear direction of a front portion of the front-side component 50 which is disposed farther to the front than a straight line C1 which connects left and right ends of the front-side component 50 is greater than a width F2 in the front and rear direction of a rear portion of the front-side component 50 which is disposed farther to the back than the straight line C1. Accordingly, when the front-side component 50 is double-folded on a crease 52 (FIG. 5) formed on the straight line C1, the front portion 50a has a portion which protrudes from the rear portion 50b, as can be seen in FIGS. 6B and 7.

The airbag 20 further includes two vent holes 27 in the front-side component 50 of the vehicle-side wall 22.

A member with a reference numeral 60 in FIG. 5 is a reinforcing cloth for reinforcing the mounting seat 25 in the peripheral portion of the inlet port 24, and members with reference numeral 61 are reinforcing cloths for reinforcing the seams 45 of the U-shaped cut-out portions 44L, 44R.

Production of the airbag 20 is now described. Firstly, a rear-side component 42 provided with the seams 45, 48 is provided. This rear-side component 42 has not yet been provided with the inlet port 24 and through holes 25a. The reinforcing cloth 60 and the central portion 38ba of the lower portion 38b of the tether 38 are sewn to the rear-side component 42. Then the inlet port 24 and through holes 25a are formed by punching. Two separate reinforcing cloths (reference numeral omitted) for the vent holes 27 are sewn to the front-side component 50 which has not yet been provided with the vent holes 27, then the vent holes 27 are formed by punching. The upper ends 38aa of the upper portions 38a of the tether 38 are sewn to the driver-side base cloth 53. Then the vehicle-side base cloth 40 is formed by sewing together the circular arc portion 51b which is the rear edge of the front-side component 50 and the circular arc portion 43a which is the front edge of the rear-side component 42. Subsequently, the vehicle-side base cloth 40 and driver-side base cloth 53 are mated with the outer surfaces facing each other, the circular arc portion 43b which is the rear edge of the rear-side component 42 and the circular arc portion 54b which is the rear edge of the driver-side base cloth 53 are sewn together as well as the circular arc portion 51a which is the front edge of the front-side component 50 and circular arc portion 54a which is the front edge of the driver-side base cloth 53 are sewn together. Thus the outer shell 21 of the airbag 20 is formed.

Thereafter, the airbag 20 is turned inside out via the inlet port 24 so that seam allowances may not be exposed outside, then the lower ends 38ab of the upper portions 38a and tongues 38bb, 38bc of the lower portion 38b of the tether 38 are taken out from the inlet port 24, then sewn together, respectively. If then the tether 38 is put back into the airbag 20, the airbag 20 is completed.

The airbag 20 thus produced is firstly flattened by folding the front-side component 50 on the crease 52 and folding the rear-side component 42 on the crease 36, as can be seen in FIGS. 6A, 6B and 7, then folded up. In advance of folding of the airbag 20, the retainer 18 has been set on the mounting seat 25 of the airbag 20 so that the not-shown bolts of the retainer 18 protrude out from the through holes 25a.

The airbag 20 as folded up is wrapped by a not-shown wrapping member. The airbag 20 and inflator 15 are mounted on the bag holder 11, then the airbag cover 17 is coupled to the bag holder 11. If then not-shown mounting brackets extending from the bag holder 11 is coupled with the connecting portion of the skeleton 2 adjoining the boss-core portion 2b, assembling of the airbag device 10 is completed and the airbag device 10 is integrated with the steering wheel W. If then the steering wheel W is mounted on the steering shaft SS, the steering wheel W as well as the airbag device 10 are mounted on the vehicle.

When the airbag device 10 is mounted on the steering wheel W, not-shown lead wires are connected to the inflator 15 for supply of actuating signal.

When an actuating signal is fed to the inflator 15 of the airbag device 10 as mounted on board, the inflator 15 emits an inflation gas G from the gas discharge ports 15b, so that the airbag 20 is inflated with the gas G, breaks the not-shown wrapping member, pushes and opens the doors 17b of the ceiling wall 17a of the airbag cover 17, then protrudes from an opening formed by opening of the doors 17b. Thus the airbag 20 is deployed over the upper surfaces RP of the boss section B and rim portion R, as indicated with dashed-and-double-dotted lines in FIGS. 1 and 2.

With the airbag device 10 in accordance with the first exemplary embodiment, when the airbag 20 as fully deployed receives the driver D moving forward as can be seen in FIG. 8, the vehicle-side wall 22 is likely to slip forward along the upper surface RP of the rim portion R, but the locking inflatable portion 33 catches on and is locked by the rear surface Rbp of the rim portion R and prevents the vehicle-side wall 22 from moving forward. This enables the receiving plane 31 of the driver-side wall 29 to stay vertically deployed and receive the driver D from the head DH to the thoracic region DB evenly, i.e. without giving him uneven reaction force. Moreover, although the rim portion R has such a shape that the length LB in the left and right direction is greater than the length LL in the front and back direction and thus a front end 20aa portion of the airbag 20 is not directly supported by the rim portion R, since the vehicle-side wall 22 does not slip forward along the upper surface RP of the rim portion R, and the front portion 20a of the airbag 20 is configured to be inflated thick, a displacement of the front portion 20a of the airbag 20 will be limited. Therefore, the front portion 20a of the airbag 20 does not collapse forward and is supported by the upper surface RP of a front end Rfe of the rim portion R. In the rear portion 20b of the airbag 20, since an inflated portion 20ba adjoining the locking inflatable portion 33 covers the rear end Rbe portion of the rim portion R, the abdomen DS of the driver D is prevented from becoming engaged with the rear end Rbe portion of the rim portion R, and the rear portion 20b of the airbag 20 is supported by the upper surface RP of the rear end Rbe portion of the rim portion R without slipping forward. Therefore, although the rim portion R is short in length in the front and back direction, the airbag 20 is supported by the upper surface RP of the rim portion R steadily and is able to receive the driver D moving forward adequately.

In the airbag device 10 in accordance with the first exemplary embodiment, therefore, despite that the airbag 20 mounted on the odd-shaped steering wheel W is configured to have a great thickness in the front portion 20a, the airbag 20 is prevented from slippage by the locking inflatable portion 33 and thus able to restrain and protect the driver D adequately.

In the first exemplary embodiment, in order to be brought into contact with the upper surface RP to the rear surface Rbp of the rear end Rbe portion of the rim portion R, the locking inflatable portion 33 of the airbag 20 is formed into such a halved circular cone that the bottom plane faces upward and the division surface, which is taken along the height of the cone, is disposed in the front side 33a. The locking surface 34 that extends from the upper edge eu to the lower edge ed of the rear surface Rbp of the rim portion R to catch on and be locked by the lower edge ed is disposed in the front side 33a of the locking inflatable portion 33.

This configuration not only restrains a forward slippage of the vehicle-side wall 22, but also prevents the rear portion 20b of the airbag 20 from floating up, because the locking surface 34 of the locking inflatable portion 33 extends from the upper edge eu to the lower edge ed of the rear surface Rbp of the rim portion R and is locked by the lower edge ed at airbag deployment. The locking surface 34 will counteract a moment of force that would act to rotate the front portion 20a of the airbag 20 as has received the driver D forward about the mounting seat 25, thereby preventing the front portion 20a of the airbag 20 from collapsing downward.

In the first exemplary embodiment, the outer shell 21 of the airbag 20 is composed of the driver-side base cloth 53 for forming the driver-side wall 29, and the vehicle-side base cloth 40 for forming the vehicle-side wall 22, and the vehicle-side base cloth 40 includes the front-side component 50 for forming a front region of the vehicle-side wall 22, and the rear-side component 42 that is connected to the rear portion of the front-side component 50 and includes a region forming the mounting seat 25. The rear-side component 42 as developed has a generally circular shape. The rear-side component 42 includes the rear cut-out portion 47 that is triangular and extends forward from the rear edge of the rear-side component 42, and two U-shaped cut-out portions 44L, 44R that extend towards the center of the rear-side component 42 along a left and right direction from left and right edges of the region of the rear-side component 42 farther rearward than the mounting seat 25. The rear cut-out portion 47 is closed by sewing the opposite edges 47a together. Each of the U-shaped cut-out portions 44L, 44R is closed by sewing the opposite edges 44a together, with the seam allowance 44c disposed on the outer surface of the airbag 20. The straight line LF that connects the outer ends 45a of the seams 45 closing the left and right U-shaped cut-out portions 44L, 44R is positioned in a vicinity of the rear end portion Rbe of the rim portion R of the steering wheel W at airbag deployment.

With this configuration, as can be seen in FIGS. 4 and 6B, the seams 45 closing the left and right U-shaped cut-out portions 44L, 44R form the raised portion 46 which is raised by an amount of the opening width W1 of the cut-out portions 44L, 44R and extends in the left and right direction, in the vehicle-side wall 22. More specifically, regions of the raised portion 46 in the vicinities of the outer edges 45a of the seams 45 are pulled rearward by the seam 48 of the rear cut-out portion 47, whereas the central region 42bc located between the left and right U-shaped cut-out portions 44L, 44R protrudes forward, thus forming the raised portion 46. This enables the central region 42bc located between the left and right U-shaped cut-out portions 44L, 44R to be folded on a region proximate to the mounting seat 25 on the crease 36 which corresponds to the straight line LF that connects the outer ends 45a of the seams 45 of the U-shaped cut-out portions 44L, 44R, in the vehicle-side wall 22, as can be seen in FIG. 6B. When the airbag 20 is inflated, a leading end 46b region of the central region 42bc is deployed towards the inlet port 24 or mounting seat 25 underneath the rim portion R of the steering wheel W. Further, since the airbag 20 is configured such that the straight line LF that connects the outer ends 45a of the seams 45 closing the left and right U-shaped cut-out portions 44L, 44R is positioned in a vicinity of the rear end portion Rbe of the rim portion R of the steering wheel W at airbag deployment, when the airbag 20 completes deployment, the leading end 46b region of the central region 42bc located between the left and right U-shaped cutout portions 44L, 44R is brought into contact with the rear surface Rbp to the lower surface RD of the rear end portion Rbe of the rim portion R, as can be seen in FIG. 8. That is, the leading end 46b region of the central region 42bc forms a top 35 of the locking inflatable portion 33 that catches on and is locked by the lower surface RD of the rear end portion Rbe of the rim portion R. A region from the outer ends 45a of the seams 45 closing the left and right U-shaped cut-out portions 44L, 44R to the leading end 46b of the central region 42bc located between the left and right U-shaped cutout portions 44L, 44R forms the locking surface 34 that is locked by the lower surface RD of the rear end portion Rbe of the rim portion R. That is, the locking inflatable portion 33 which has a three-dimensional shape of a halved circular cone and includes the locking surface 34 in the front side is formed merely by forming three cut-out portions 44L, 44R, 47 at predetermined positions in a planar base cloth 40 (41) and closing the same.

In the first exemplary embodiment, especially, the seam allowance 44c of each of the U-shaped cut-out portions 44L, 44R is turned down towards the mounting seat 25 or inlet port 24 in a vicinity of the outer edge 45a joined with the driver-side base cloth 53, as can be seen in FIGS. 3, 4 and 6B. This configuration will help deploy the leading end 46b of the raised portion 46, in other words, the leading end 35 of the locking inflatable portion 33, towards the mounting seat 25 at airbag deployment. Therefore, the front surface or locking surface 34 of the locking inflatable portion 33 will be tightly locked by the rear end portion Rbe of the rim portion R.

An airbag device 10A for a driver's seat in accordance with a second exemplary embodiment is not described referring to FIGS. 9 to 13. Except a configuration of an airbag 20A, the airbag device 10A in accordance with the second exemplary embodiment has same configurations as the airbag device 10 of the first exemplary embodiment in the bag holder, inflator, retainer and airbag cover. The airbag device 10A is mounted on a boss section B of a steering wheel W (or wheel body 1) having an odd shape which is the same as the first exemplary embodiment.

Similarly to the airbag 20 of the first exemplary embodiment, an outer shell 21 of the airbag 20A includes a vehicle-side wall 22A that includes an inlet port 24 of an inflation gas and is configured to be supported by the upper surface RP of the rim portion R when deployed, and a driver-side wall 29A that extends from an outer circumferential edge 23 of the vehicle-side wall 22A and covers the inlet port 24 for receiving the driver. The vehicle-side wall 22A is greater than the rim portion R of the steering wheel W (FIG. 9) in outside dimension in a front and back direction and in a left and right direction. The inlet port 24 and a mounting seat 25 which is disposed in a periphery of the inlet port 24 for mounting on the boss section B is located in a vicinity of the center of the vehicle-side wall 22A.

Figure 9:
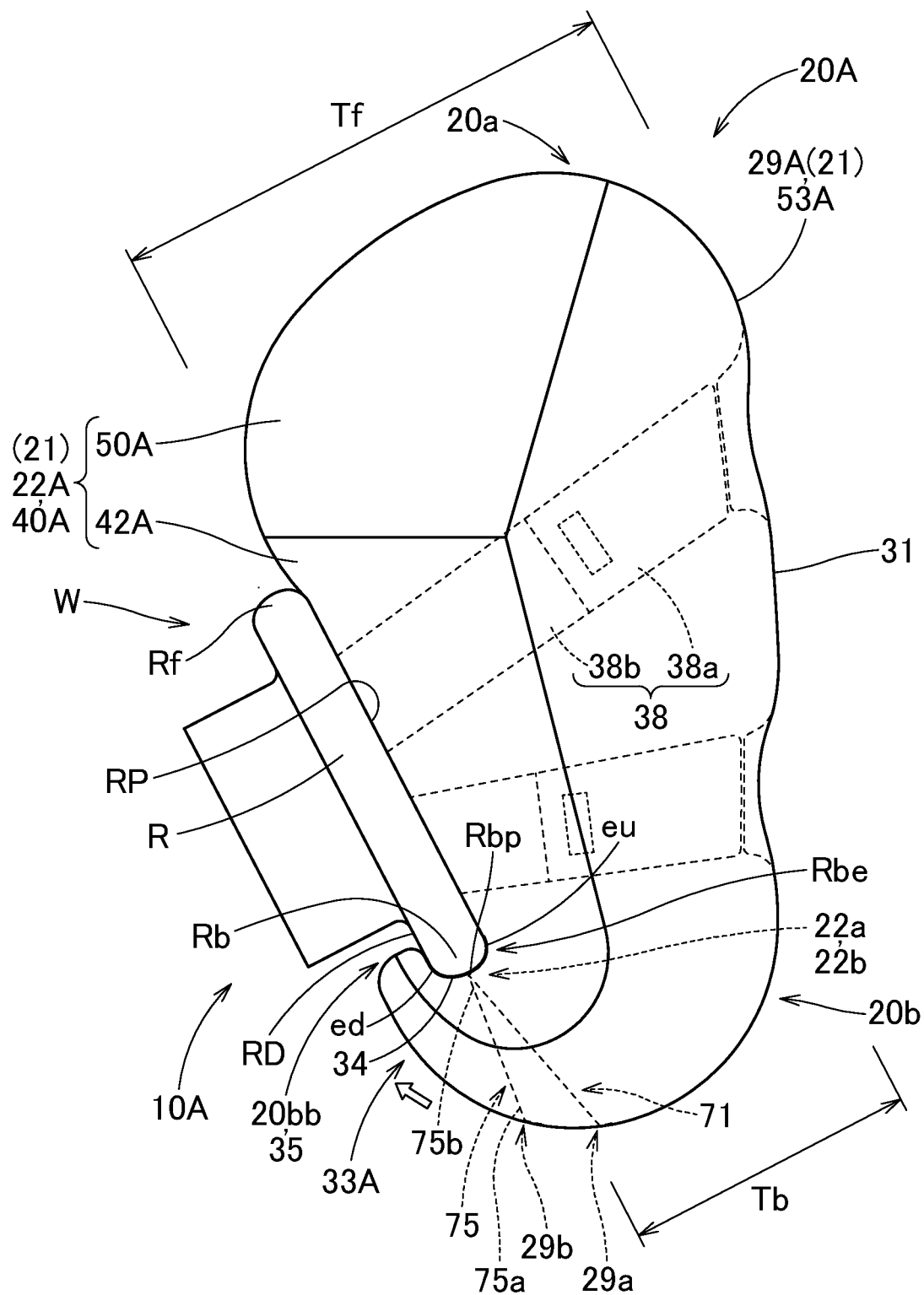
FIG. 9 is a side view of an airbag device in accordance with a second exemplary embodiment at airbag deployment.

As can be seen in FIG. 9, the airbag 20A is also configured to be inflated in such a fashion that the front portion 20a above the rim portion R has a greater thickness Tf than a thickness Tb of the rear portion 20b in order that a central region (i.e. receiving plane 31) of the driver-side wall 29A is deployed generally vertically at airbag deployment. The airbag 20A also includes, in a rear portion of the vehicle-side wall 22A as deployed, a locking inflatable portion 33A that protrudes downward from a vicinity of an upper surface RP of the rim portion R so as to be locked by a rear surface Rbp of the rim portion R and prevent the front portion 20a of the airbag 20A from slipping forward.

Figure 13:
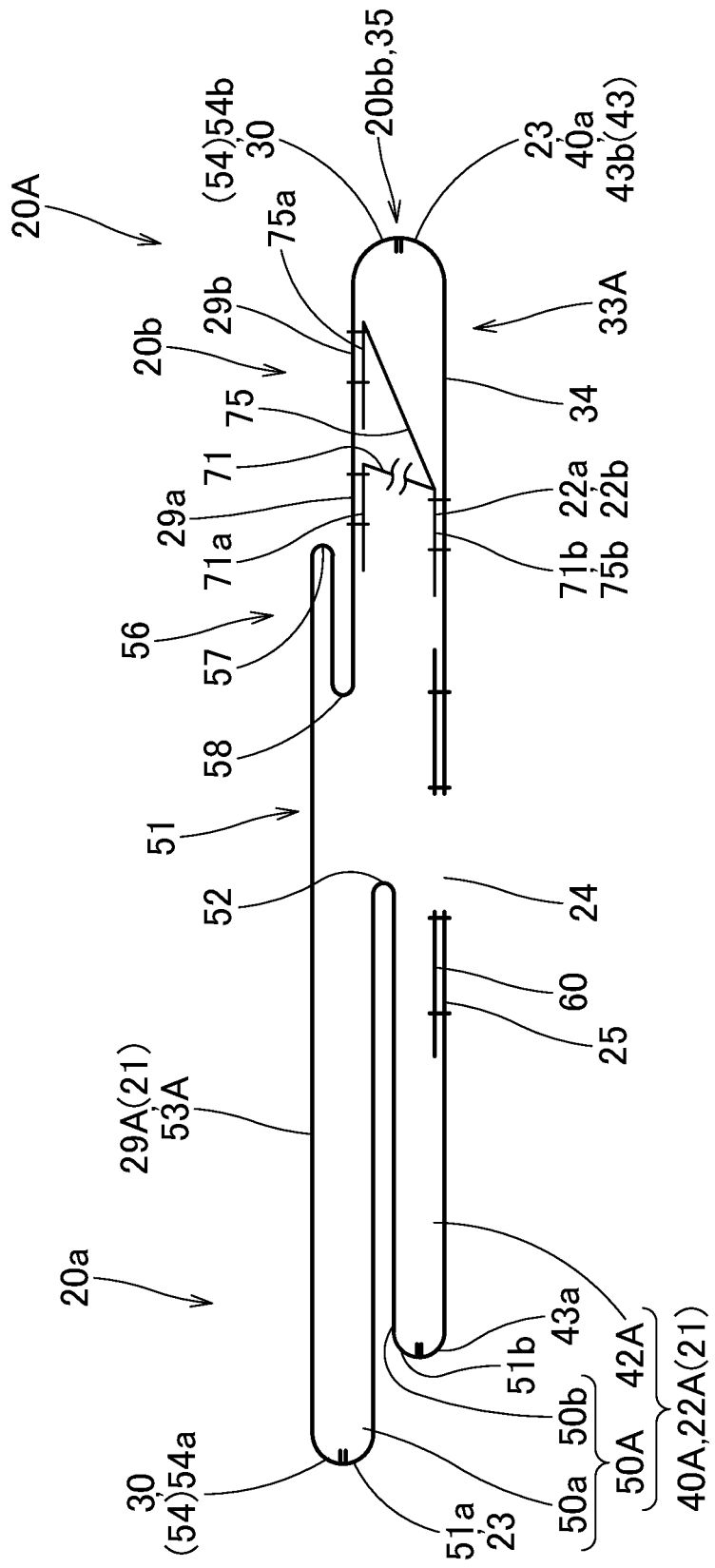
FIG. 13 is a schematic sectional view taken along line XIII-XIII of FIG. 12B.

The locking inflatable portion 33A is formed by two kinds of tethers, i.e. two long tethers 71 and two short tethers 75, that connect the driver-side wall 29A and vehicle-side wall 22A at a vicinity of a center in a left and right direction of and inside of a rear end 20bb (FIG. 13) region of the airbag 20A. Each of the long tethers 71 has a length L1 which is greater than a length L2 of each of the short tethers 75. Each of the long tethers 71 is joined to the vehicle side wall 22A by the lower end 71b, with a joint portion 22a, and joined to the driver-side wall 29A by the upper end 71a, with a joint portion 29a. Each of the short tethers 75 is joined to the vehicle side wall 22A by the lower end 75b, with a joint portion 22b, and joined to the driver-side wall 29A by the upper end 75a, with a joint portion 29b. The joint portion 22a of the long tether 71 and the joint portion 22b of the short tether 75 are arranged generally one behind another in the vehicle-side wall 22A, and the joint portion 29a of the long tether 71 and the joint portion 29b of the short tether 75 are arranged generally one behind another in the driver-side wall 29A. The joint portions 22a and 22b to the vehicle-side wall 22A are designed to be located in a vicinity of the rear end portion Rbe of the rim portion R at airbag deployment, as can be seen in FIG. 9. Both of the joint portions 29a and 29b to the driver-side wall 29A are located farther rearward than the joint portions 22a and 22b to the vehicle-side wall 22A, and the joint portion 29b of the short tether 75 is located farther rearward than the joint portion 29a of the long tether 71 in the driver-side wall 29A, as can be seen in FIGS. 10 and 13.

Figure 10:
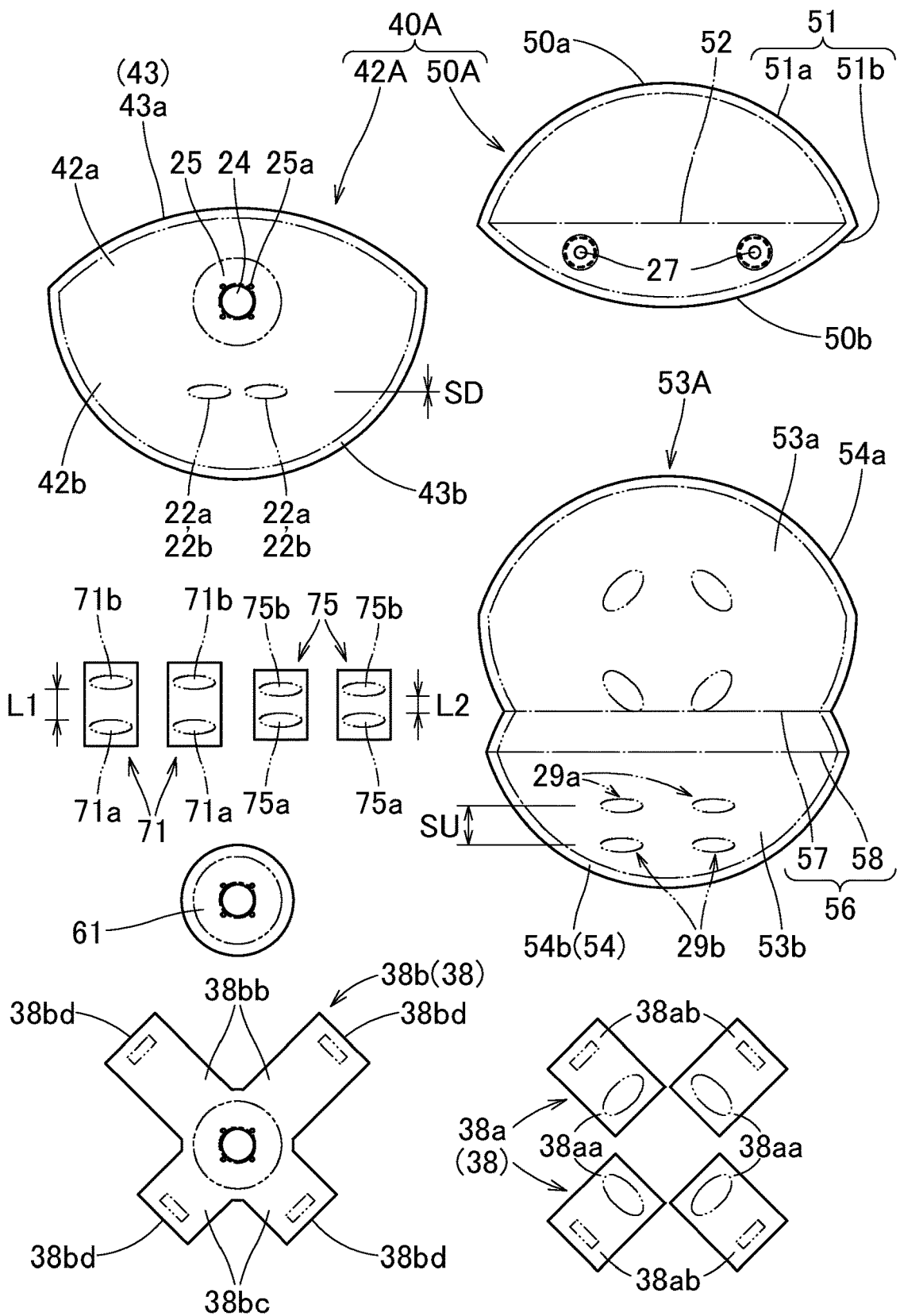
FIG. 10 depicts components of an airbag for use in an airbag device in accordance with the second exemplary embodiment in plan.
Figure 11:
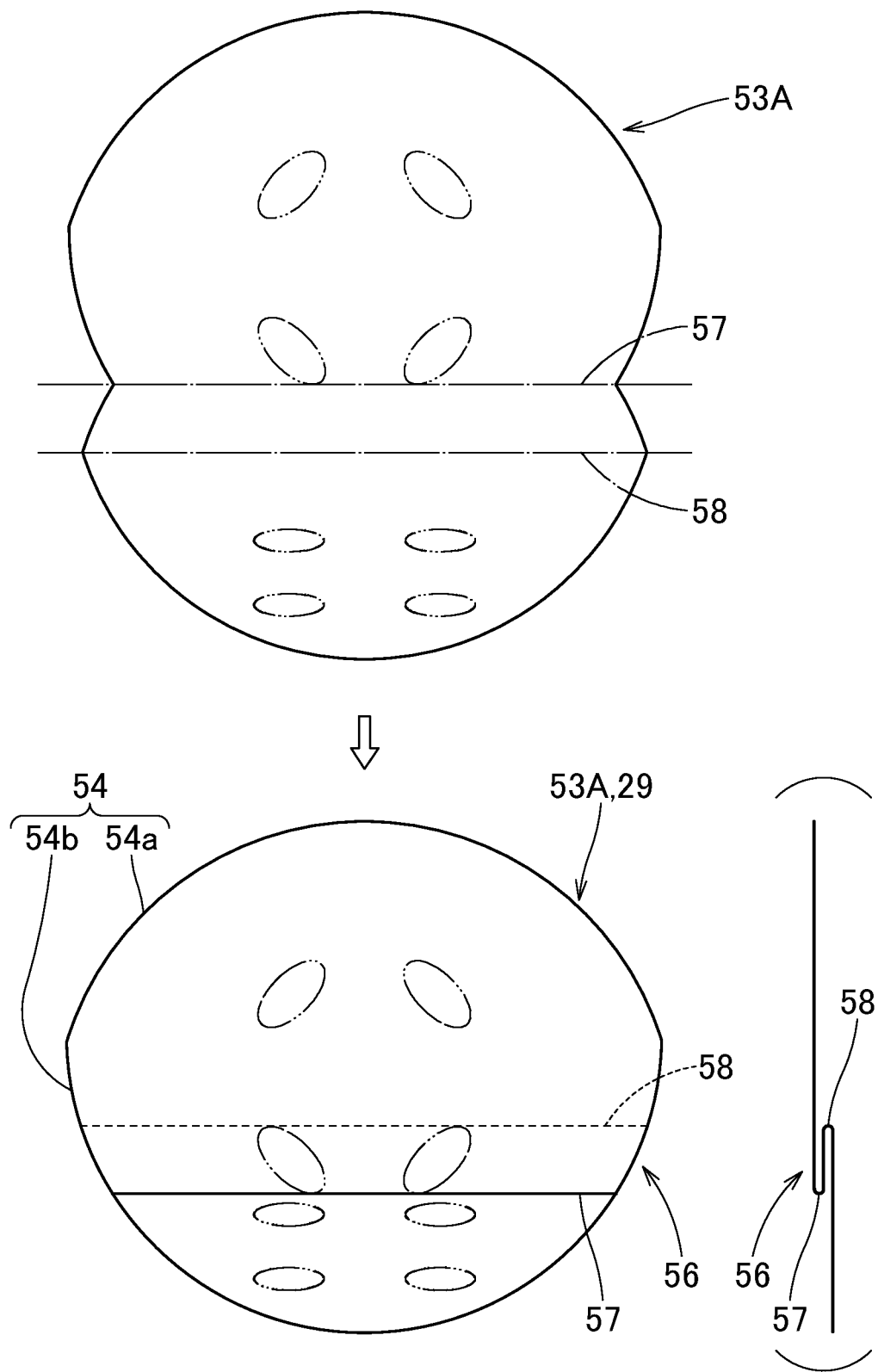
FIG. 11 depicts a process of forming a pleated portion in a driver-side base cloth of the airbag in accordance with the second exemplary embodiment.

Moreover, a distance SU between the joint portions 29a and 29b to the driver-side wall 29A of the long tether 71 and short tether 75 is greater than a distance SD between the joint portions 22a and 22b to the vehicle-side wall 22A of the long tether 71 and short tether 75, as can be seen in FIG. 10. A difference between the distance SU and distance SD and a difference between the length L1 and L2 enable the locking inflatable portion 33A to deploy in such a manner as to wrap around the rear end portion Rbe of the rim portion R from the rear surface Rbp to the lower surface RD at airbag deployment. That is, since an area of the driver-side wall 29A between the joint portions 29a and 29b is greater than an area of the vehicle-side wall 22A between the joint portions 22a and 22b, the former is inflated more largely than the latter at airbag deployment, and a region of the airbag 20A in a vicinity of the upper ends 75a of the short tethers 75 which is shorter than the long tethers 71 rotates rearward (or downward) about a region in a vicinity of the lower ends 75b as the airbag 20A is inflated. Thus, the rear end 20bb region of the airbag 20A forms the locking inflatable portion 33A that wraps around the rear end portion Rbe of the rim portion R from the rear surface Rbp to the lower surface RD and is locked by the rear end portion Rbe of the rim portion R at airbag deployment. In the second exemplary embodiment, especially, the joint portions 22a and 22b of the long tethers 71 and short tethers 75 to the vehicle-side wall 22A are located at the same position, i.e. the distance SD between the joint portions 22a and 22b is zero, thereby inflating the area of the driver-side wall 29A between the joint portions 29a and 29b largely, and rotating the region in the vicinity of the upper end 75a of the short tether 75 about the region in the vicinity of the lower end 75b, and therefore, the rear end 20bb region of the airbag 20A, i.e. the locking inflatable portion 33A, wraps around the rear end portion Rbe of the rim portion R from the rear surface Rbp to the lower surface RD efficiently and further tightly and is locked by the rear end portion Rbe of the rim portion R.

In the second exemplary embodiment, the two long tethers 71 are located at a distance from each other on both sides of a vicinity of the center in the left and right direction of the airbag 20A, and so are the two short tethers 75. That is, a space 80 is provided between each of the long tethers 71 and short tethers 75. A distance between the upper ends 71a of the long tethers 71 and a distance between the upper ends 75a of the short tethers 75 in the driver-side wall 29A are respectively greater than a distance between the lower ends 71b of the long tethers 71 and a distance between the lower ends 75b of the short tethers 75 in the vehicle-side wall 22A, as can be seen in FIG. 10.

As can be seen in FIG. 10, the outer shell 21 of the airbag 20A in accordance with the second exemplary embodiment is composed of a driver-side base cloth 53A for forming the driver-side wall 29A, and a vehicle-side base cloth 40A for forming the vehicle-side wall 22A. The driver-side base cloth 53A includes a tuck or pleated portion 56 (FIG. 11) formed on two creases 57 and 58 that extend in a left and right direction, in a region farther rearward than a center in a front and back direction of the driver-side base cloth 53A and farther forward than the joint portions 29a of the long tethers 71. An outer circumferential edge 54 of the driver-side base cloth 53A as provided with the pleated portion 56 is sewn together with an outer circumferential edge 40a of the vehicle-side base cloth 40A. As can be seen in FIG. 10, the vehicle-side base cloth 40A includes a front-side component 50A having a generally circular shape and a rear-side component 42A provided with a region for forming the mounting seat 25. The rear-side component 42A does not include any cut-out portions like those 44, 47 of the rear-side component 42 in the first exemplary embodiment. The vehicle-side base cloth 40A is formed by sewing a circular arc portion 51b in a rear portion 50b of the front-side component 50A and a circular arc portion 43a in a front portion 42a of the rear-side component 42A.

To produce the airbag 20A, a reinforcing cloth 60 and a lower portion 38b of the tether 38 are firstly sewn to the rear-side component 40A, and an inlet port 24 and through holes 25a are formed by punching. Upper portions 38a of the tether 38 and upper ends 71a, 75a of the long and short tethers 71, 75 are sewn to the driver-side base cloth 53A as has been provided with the pleated portion 56. Subsequently, the vehicle-side base cloth 40A and driver-side base cloth 53A are mated with the outer surfaces facing each other and sewn together by the outer circumferential edges 54 and 50a, then the airbag 20A is turned inside out via the inlet port 24 so that seam allowances may not be exposed outside. Then lower ends 38ab of the upper portions 38a and tongues 38bb, 38bc of the lower portion 38b of the tether 38 are taken out from the inlet port 24, sewn together, respectively, then the tether 38 is put back into the airbag 20A. If then the lower ends 71b, 75b of the long tethers 71 and short tethers 75 are joined to the joint portions 22a, 22b in the vehicle-side base cloth 40A, the airbag 20A is completed.

Figure 12A:
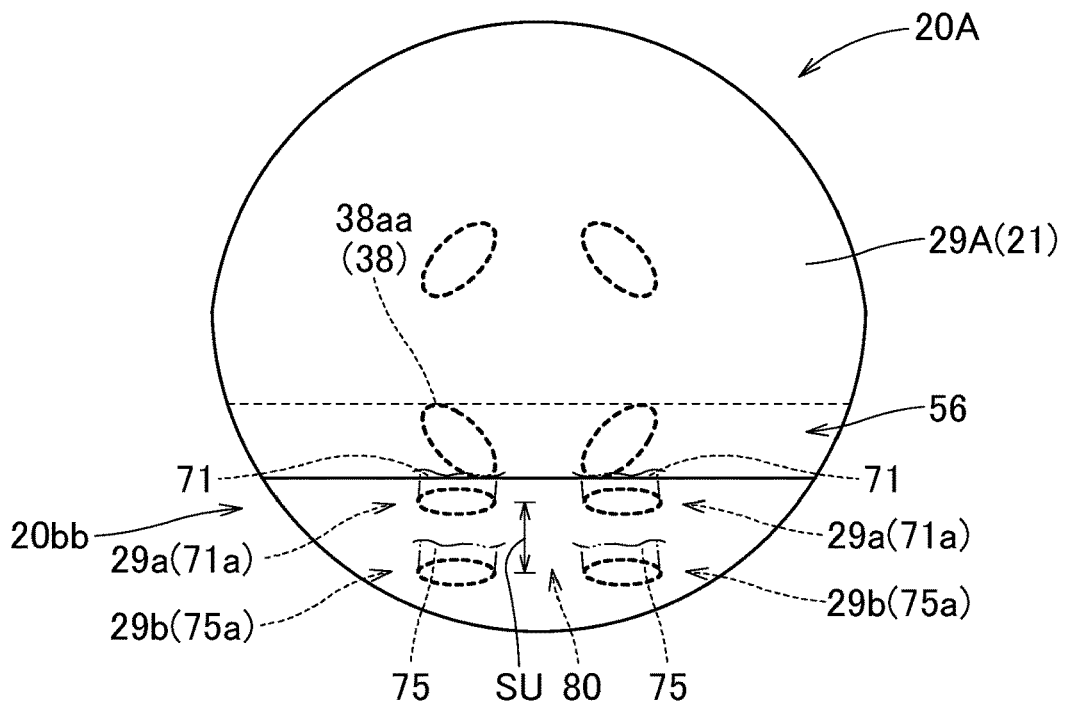
FIG. 12A is a plan view of the airbag in accordance with the second exemplary embodiment as flatly developed.
Figure 12B:
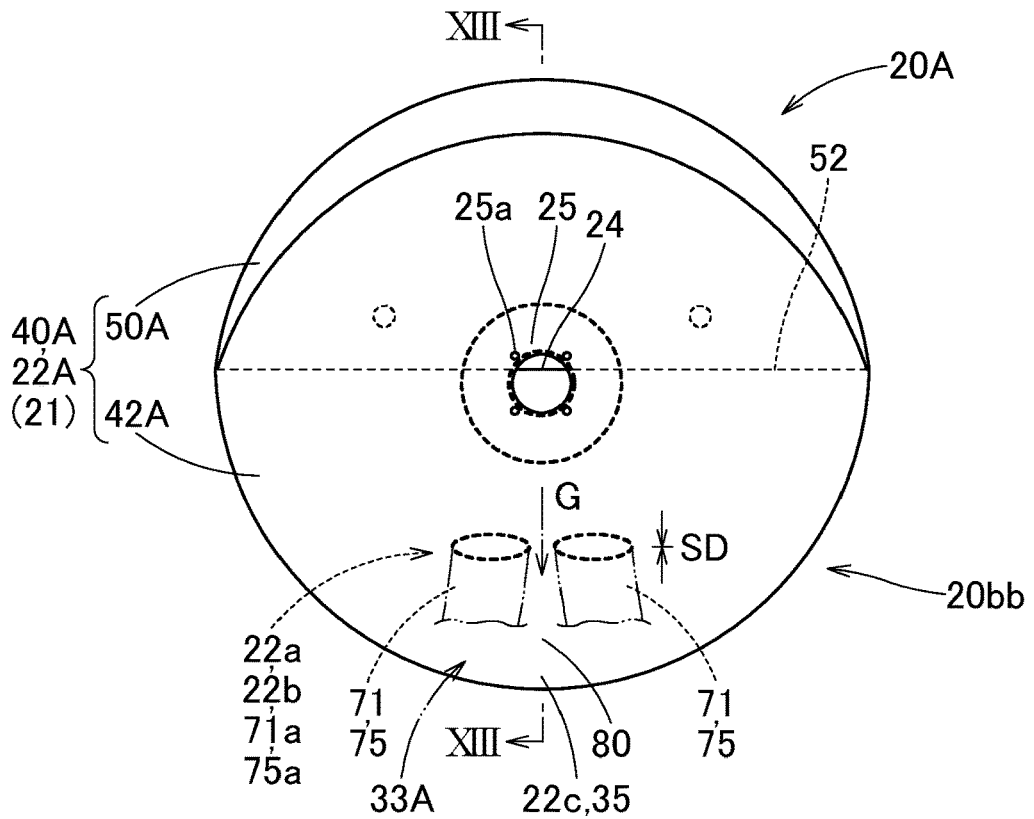
FIG. 12B is a bottom view of the airbag of FIG. 12A.

The airbag 20A thus produced is flattened by folding the front-side component 50A of the vehicle-side base cloth 40A on the crease 52, as can be seen in FIG. 12, a not-shown retainer is put inside the airbag 20A, then the airbag 20A is folded up. Then the airbag 20A is mounted on the steering wheel W, i.e. on the vehicle in a similar fashion to the first exemplary embodiment.

When the airbag device 10A in accordance with the second exemplary embodiment is actuated, as can be seen in FIG. 9, the airbag 20A is inflated with an inflation gas, and the locking inflatable portion 33A is formed in the airbag 20A by the long and short tethers 71 and 75 located in the rear portion 20b of the airbag 20A. The locking inflatable portion 33A deploys in such a manner as to wrap around the rear end portion Rbe of the rim portion R of the steering wheel W from the rear surface Rbp to the lower surface RD and is locked by the rear end portion Rbe of the rim portion R. In the airbag device 10A in accordance with the second exemplary embodiment, therefore, despite that the airbag 20A mounted on the odd-shaped steering wheel W is configured to have a great thickness in the front portion 20a, the airbag 20A is prevented from slippage by the locking inflatable portion 33A and thus able to restrain and protect the driver adequately.

In the second exemplary embodiment, the locking inflatable portion 33A is formed merely by providing the long and short tethers 71, 75 in the rear portion 20b of the airbag 20A. Further, this configuration will not increase the volume of the airbag 20A.

In the second exemplary embodiment, especially, the joint portions 22a and 22b of the long tethers 71 and short tethers 75 to the vehicle-side wall 22A are located at the same position, i.e. the distance SD between the joint portions 22a and 22b is zero, thereby inflating the area of the driver-side wall 29A between the joint portions 29a and 29b of the tethers 71, 75 farther largely, and rotating the region in the vicinity of the upper ends 75a of the short tethers 75 about the region in the vicinity of the lower ends 75b, and therefore, the rear end 20bb region of the airbag 20A, i.e. the locking inflatable portion 33A, wraps around the rear end portion Rbe of the rim portion R from the rear surface Rbp to the lower surface RD efficiently and further tightly, and is locked by the rear end portion Rbe of the rim portion R.

In the second exemplary embodiment, furthermore, the two long tethers 71 are located at a distance from each other on both sides of a vicinity of the center in the left and right direction of the airbag 20A, and so are the two short tethers 7, thereby a space 80 is provided between each of the long tethers 71 and short tethers 75. This configuration will allow an inflation gas G fed via the inlet port 24 located in a vicinity of the center in the front and back direction of the airbag 20A to flow through the spaces 80 formed between each of the long tethers 71 and short tethers 75 smoothly to the leading end or top 35 of the locking inflatable portion 33A which is located in the rear end 20bb region of the airbag 20A.

In the second exemplary embodiment, furthermore, the outer shell 21 of the airbag 20A is composed of the driver-side base cloth 53A for forming the driver-side wall 29A, and the vehicle-side base cloth 40A for forming the vehicle-side wall 22A. The driver-side base cloth 53A includes the tuck or pleated portion 56 that is formed on a plurality of creases 57, 58 which extend in a left and right direction in a region farther rearward than the center in a front and back direction of the driver-side base cloth 53A and farther forward than the joint portions 29a of the long tethers 71. The driver-side base cloth 53A as provided with the pleated portion 56 and the vehicle-side base cloth 40A are sewn together by the outer circumferential edges 54 and 40a.

With this configuration, due to unfolding of the pleated portion 56, a film length of the driver-side wall 29A in a front and back direction will lengthen at a vicinity of the center in the left and right direction at airbag deployment, and this will further encourage such a deployment behavior of the airbag 20A that the region in a vicinity of the upper ends 75a of the short tethers 75 rotates rearward or downward, so that the locking inflatable portion 33A wraps around the rear end portion Rbe of the rim portion R from the rear surface Rbp to the lower surface RD and is tightly locked by the rear end portion Rbe of the rim portion R by the deployed leading end 35.

When the airbag is provided with two kinds of, i.e. long and short, tethers 71, 75, the airbag may be configured like an airbag 20B of an airbag device 10B in accordance with a third exemplary embodiment depicted in FIGS. 14 to 16B. The airbag device 10B is mounted on a boss section B of a steering wheel W (or wheel body 1) which is the same as the first and second exemplary embodiments. The airbag 20B of the third exemplary embodiment is similar to the airbag 20A of the second exemplary embodiment except in including an outer tether 77.

Figure 14:
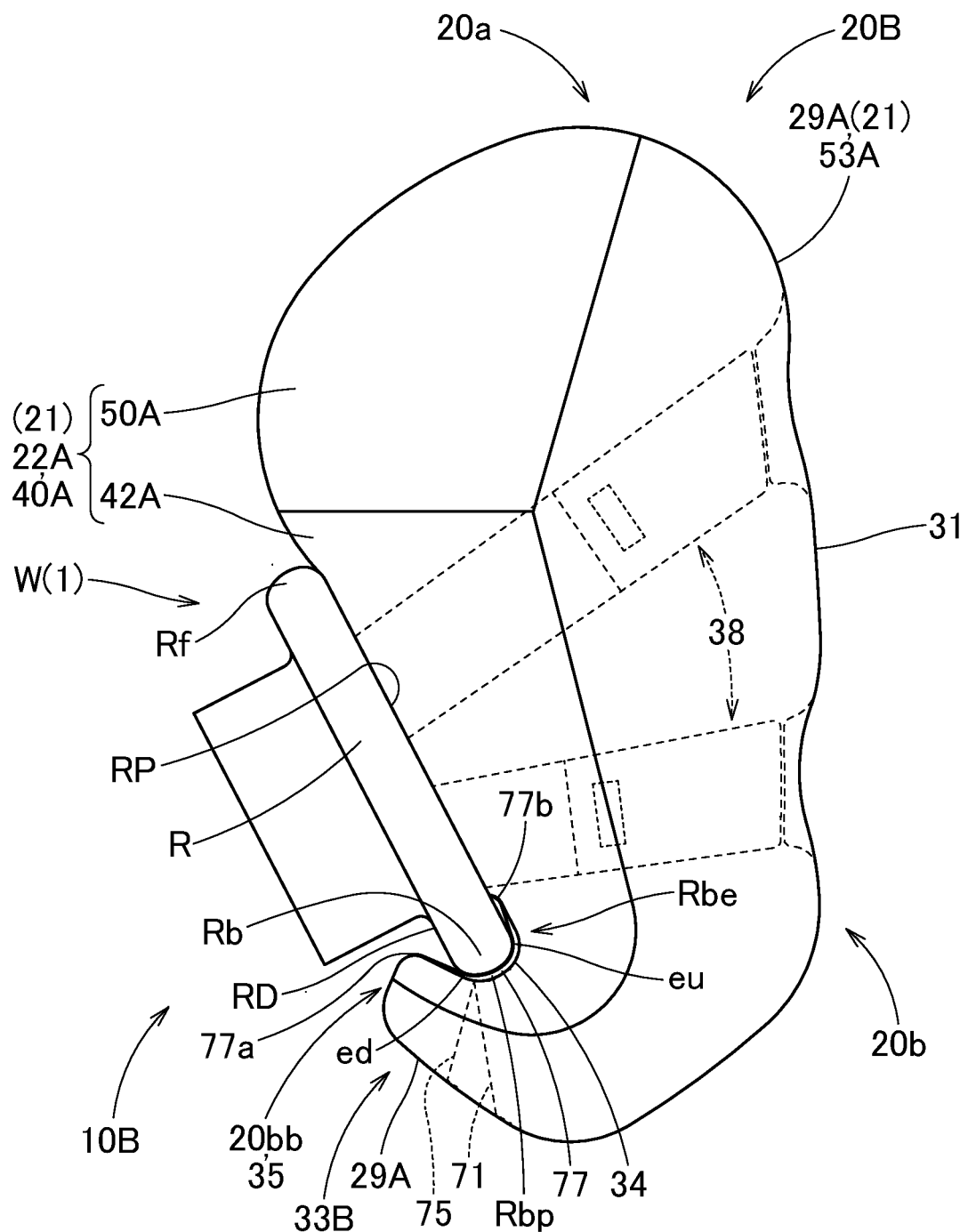
FIG. 14 is a side view of the airbag device in accordance with the second exemplary embodiment at airbag deployment.
Figure 15:
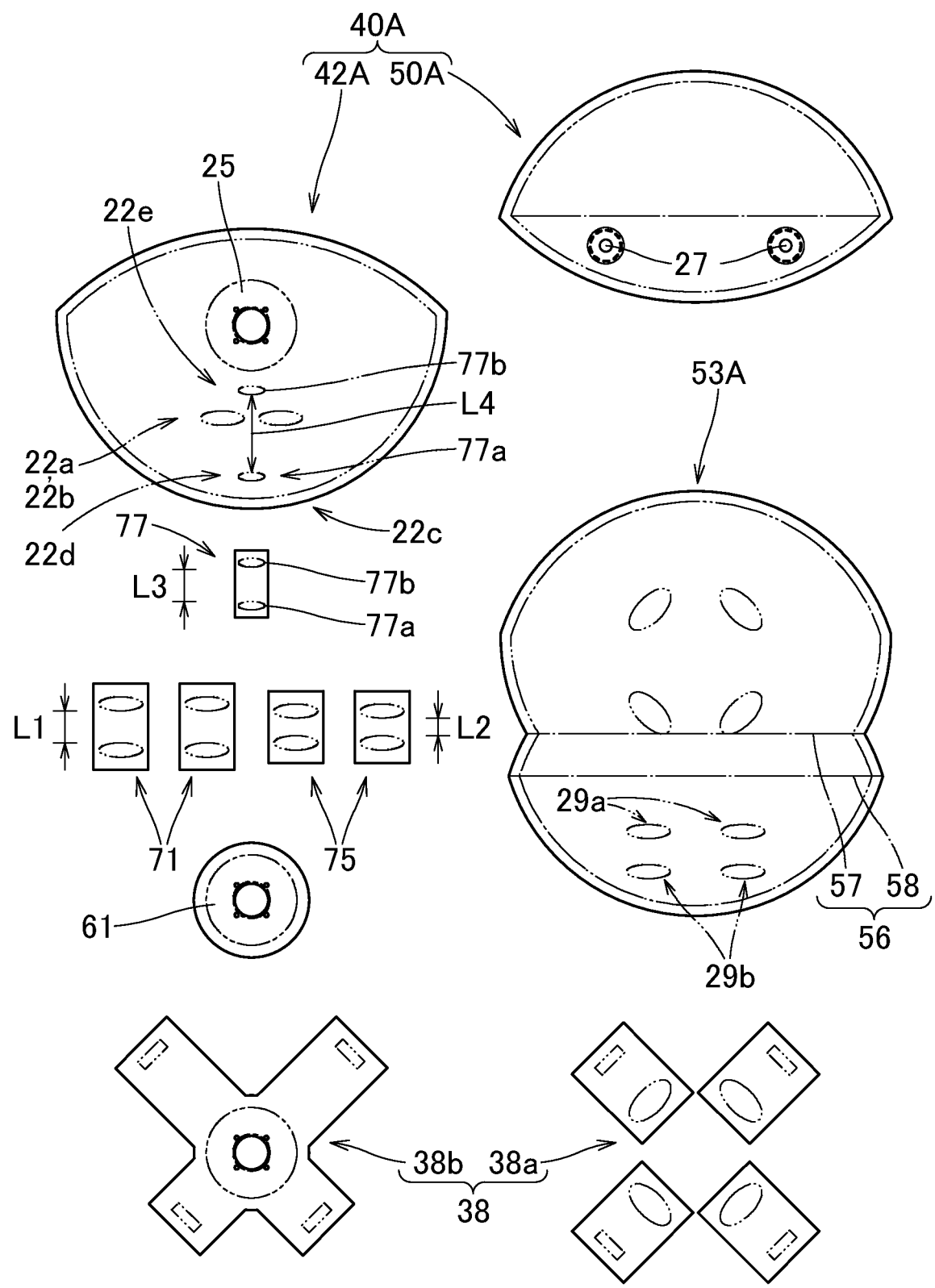
FIG. 15 depicts components of an airbag for use in an airbag device in accordance with a third exemplary embodiment in plan.

The airbag device 10B in accordance with the third exemplary embodiment has same configurations as the airbag devices 10, 10A in the bag holder (not shown), inflator, retainer and so on. As can be seen in FIGS. 14 and 15, the airbag 20B also includes a vehicle-side wall 22A composed of a vehicle-side base cloth 40A, a driver-side wall 29A provided with a pleated portion 56 and component of a driver-side base cloth 53A, a tether 38 and so on.

The outer tether 77 is disposed on an outer surface of a vicinity of a center in a left and right direction of a rear region of the vehicle-side wall 22A. A first end (or rear end) 77a of the outer tether 77 is joined to a vicinity of a rear end 22c of the vehicle-side wall 22A by a joint portion 22d, and a second end (or front end) 77b is joined to a position rearward of the mounting seat 25 and forward of a joint portion 22b of the short tether 75 to the vehicle-side wall 22A by a joint portion 22e. A length L3 of the outer tether 77 is shorter than a distance L4 between the joint portions 22d and 22e. In other words, the length L3 of the outer tether 77 is such as to bend the rear end 22c region of the vehicle-side wall 22A towards the inlet port 24 when the airbag 20B is inflated by itself.

With the above-described configuration, the outer tether 77 further helps bend the locking inflatable portion 33B such that the locking inflatable portion 33B wraps around the rear end portion Rbe of the rim portion R of the steering wheel W from the rear surface Rbp to the lower surface RD and is locked further tightly by the rear end portion Rbe of the rim portion R, as can be seen in FIG. 14. Especially, as can be seen in FIG. 16, the outer tether 77 is brought into contact with the rear end portion Rbe of the rim portion R and makes a substantial length of a region between the joint portions 22d and 22e shorter in the course of deployment, thereby bending the locking inflatable portion 33B furthermore.

In the airbag 20B in accordance with the second exemplary embodiment, moreover, since the outer tether 77 pulls and separates the vehicle-side wall 22A from the driver-side wall 29A in the locking inflatable portion 33B at airbag deployment, an inflation gas G will smoothly flow to the leading end 35 of the locking inflatable portion 33B, thereby quickly deploying the locking inflatable portion 33B into such a shape as to be steadily locked by the rear end portion Rbe of the rim portion R.

The airbag provided with a long tether and a short tether may further alternatively be configured like an airbag 20C of an airbag device 100 in accordance with a fourth exemplary embodiment depicted in FIGS. 17 to 19B. The airbag device 10C is mounted on a boss section B of a steering wheel W (or wheel body 1) which is the same as the first to third exemplary embodiments. The airbag 20C of the fourth exemplary embodiment is similar to the airbag 20A of the second exemplary embodiment, but a long tether 71C, which concurrently acts as a bulkhead 72, replaces the long tether 71, as will be described later.

Figure 17:
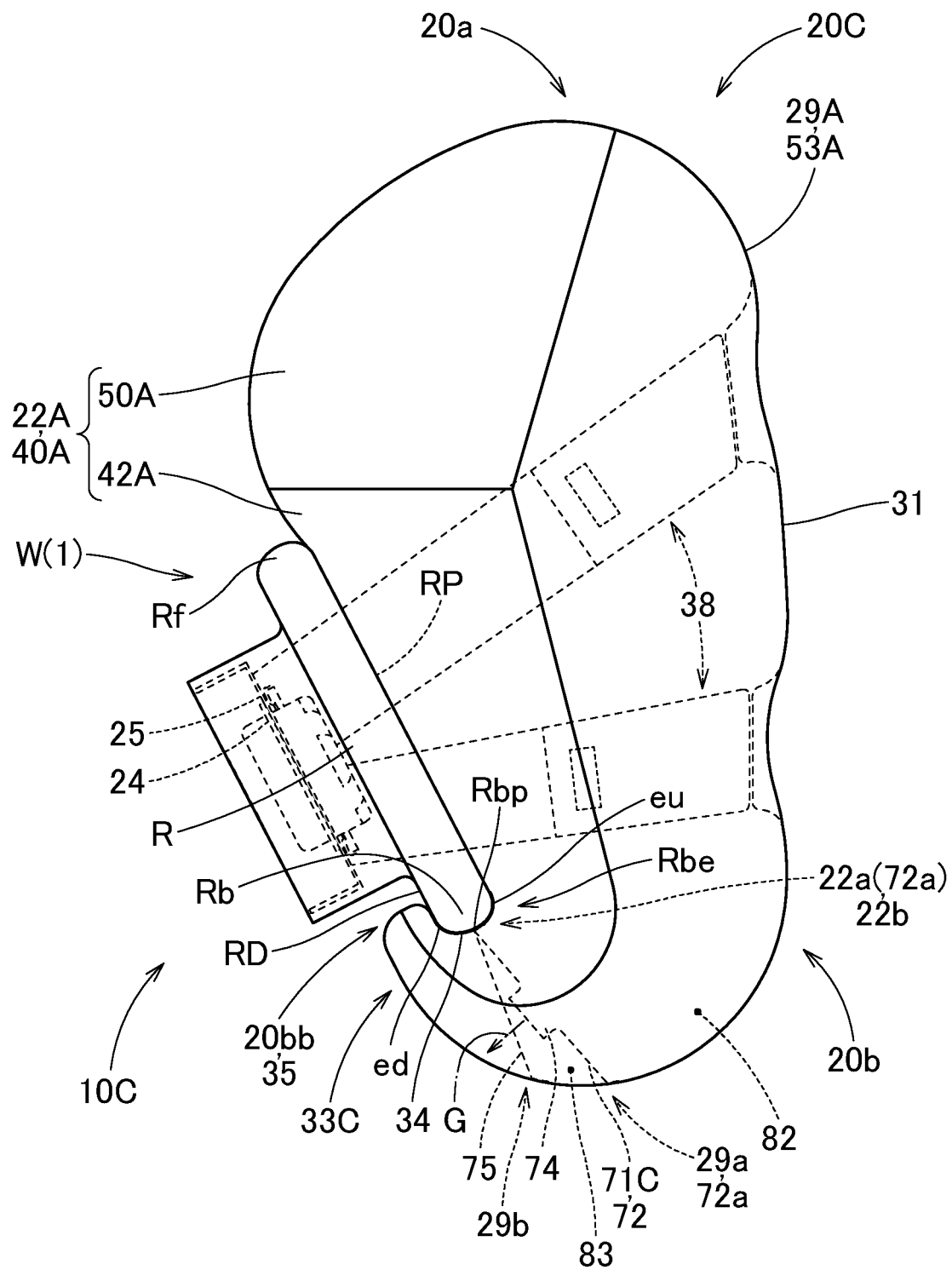
FIG. 17 is a side view of an airbag device in accordance with a fourth exemplary embodiment at airbag deployment.
Figure 18:
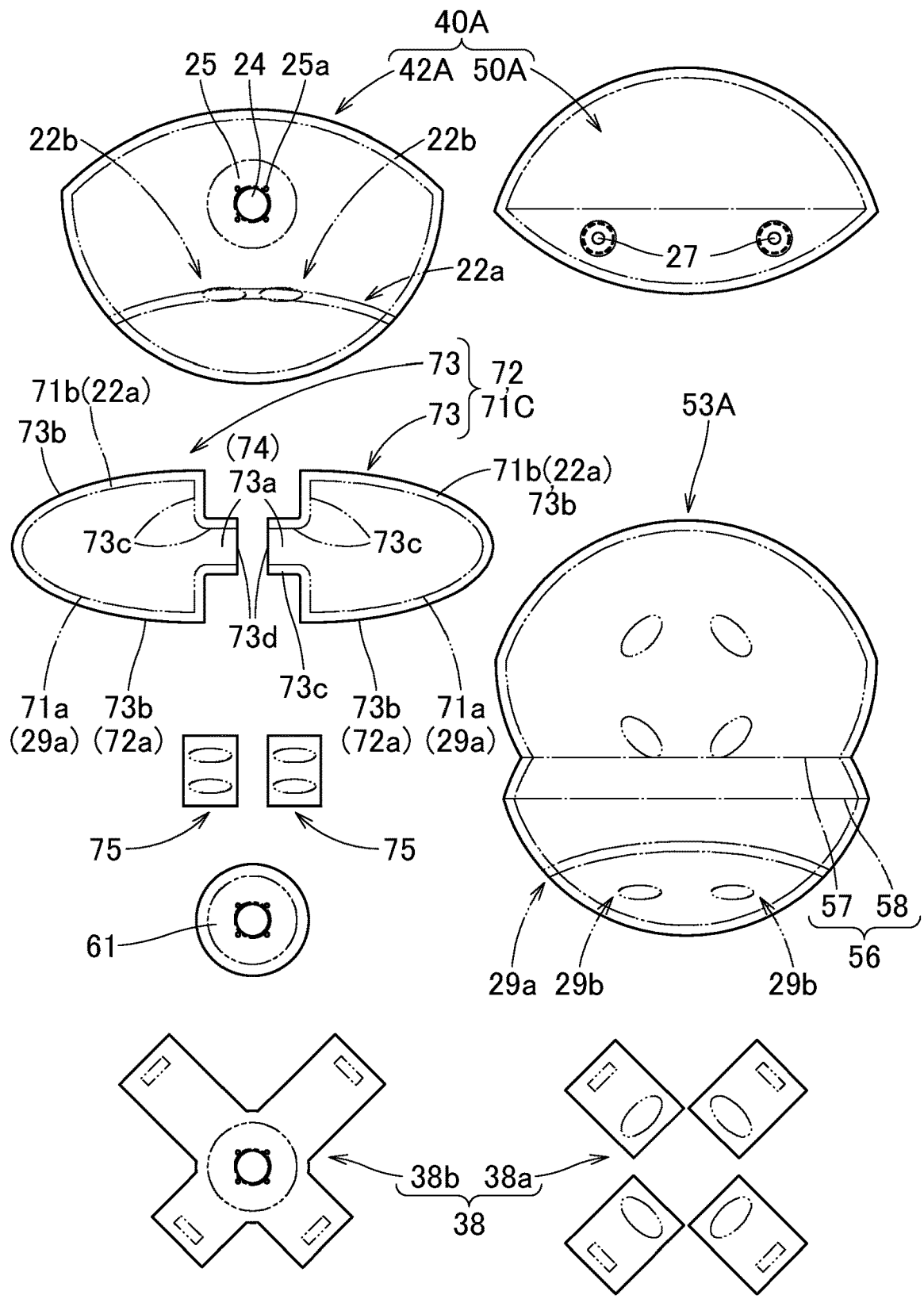
FIG. 18 depicts components of an airbag for use in the airbag device in accordance with the fourth exemplary embodiment in plan.
Figure 19A:
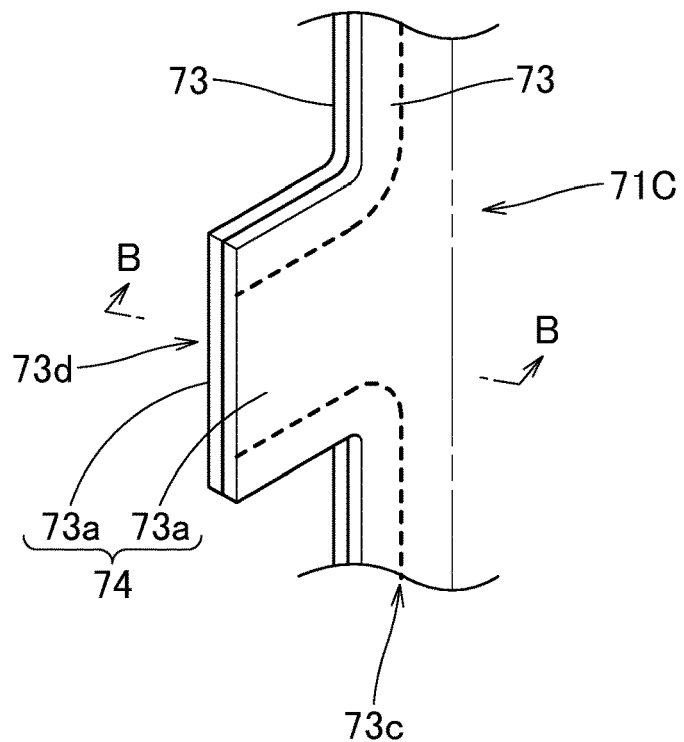
FIG. 19A is a schematic perspective view of a check valve in the airbag in accordance with the fourth exemplary embodiment.
Figure 19B:
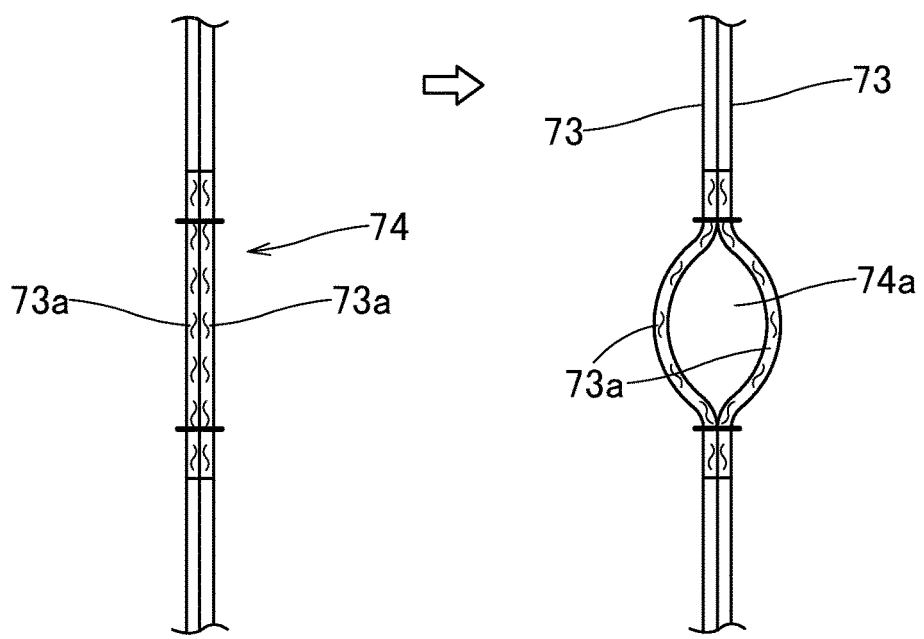
FIG. 19B depicts a behavior of the check valve in the airbag in accordance with the fourth exemplary embodiment in sectional view taken along line B-B of FIG. 19A.

The airbag device 100 in accordance with the fourth exemplary embodiment has same configurations as the airbag devices 10, 10A, 10B in the bag holder (not shown), inflator, retainer and so on. As can be seen in FIGS. 17 and 18, the airbag 20C also includes a vehicle-side wall 22A composed of a vehicle-side base cloth 40A, a driver-side wall 29A provided with a pleated portion 56 and composed of a driver-side base cloth 53A, a tether 38, a short tether 75 and so on.

The long tether 71C of the airbag 100 acts as a bulkhead 72 that is joined to inner surfaces of the driver-side wall 29A and vehicle-side wall 22A by the outer circumferential edge 72a and divides the airbag 20C into a rear chamber 83 located towards the rear end 20bb of the airbag 20C and a front chamber 82 located towards the inlet port 24. The bulkhead 72 includes a check valve 74 that permits a flow of inflation gas G through it to the rear end 20bb region of the airbag 20C but restricts a reverse flow.

More specifically, referring to FIG. 18, the bulkhead 72 is composed of two separate members 73 that are separated in a left and right direction and sewn together by the center of the bulkhead 72 with a center seam 73c. The outer circumferential edge 72a of the bulkhead 72 is sewn to the inner surface of the airbag 20C at the position of the long tether 71C with a circumferential seam 73b. Each of the separate members 73 includes a protruding portion 73a which protrudes from a vicinity of the region to be sewn by the center seam 73c in a rectangular shape. The center seam 73c sews together the separate members 73 including upper and lower edges of the protruding portions 73a, but leaves the leading ends of the protruding portions 73a unsewn, as unsewn portions 73d. The protruding portions 73a protrude towards the short tethers 75. The unsewn portions 73d of the protruding portions 73a constitute an opening 74a of the check valve 74. At closing of the check valve 74, the protruding portions 73a are brought into close contact with each other and closes the opening 74a. That is, when the airbag 20C is inflated with an inflation gas G fed via the inlet port 24, the protruding portions 73a are separated from each other and opens the opening 74a of the check valve 74, so that an inflation gas G flows to the rear chamber 83, i.e. the locking inflatable portion 33C where the short tethers 75 are disposed. In the locking inflatable portion 33C as inflated, the protruding portions 73a are brought into close contact with each other due to pressure of the inflation gas G, so that the check valve 74 is closed and restricts a reverse flow of the inflation gas G to the front chamber 82.

With the configuration of the airbag 20C of the airbag device 10C, the bulkhead 72 which concurrently acts as the long tether 71C functions to prevent a drop of internal pressure of the locking inflatable portion 33C by the check valve 74. Therefore, the locking inflatable portion 33C will keep its fully inflated shape and keep tightly locked by the rear end portion Rbe of the rim portion R.

An exemplary embodiment of the disclosure relates to an airbag device for a driver's seat, including a steering wheel that is adapted to be mounted on a vehicle in such a manner that the central axis of rotation extends obliquely rearwardly and upwardly, and an airbag device. The steering wheel includes a rim portion configured for gripping, the rim portion being disposed in an outer circumferential edge of the steering wheel apart from the central axis of rotation, the rim portion as viewed from above having such a shape that a length in a left and right direction is greater than a length in a front and back direction, and a boss section that is disposed in a vicinity of the central axis of rotation. The airbag device is mounted on the boss section of the steering wheel for protecting a driver, the airbag device including an airbag that is configured to be deployed from the boss section and supported by an upper surface of the rim portion. An outer shell of the airbag includes a vehicle-side wall that is configured to be supported by the upper surface of the rim portion when deployed, the vehicle-side wall being greater than the rim portion in outside dimension in the front and back direction and in the left and right direction, the vehicle-side wall including, in a vicinity of the center, an inlet port for introducing an inflation gas, and a mounting seat which is disposed in a periphery of the inlet port and by which the airbag is mounted on the boss section; and a driver-side wall for receiving the driver, the driver-side wall extending from an outer circumferential edge of the vehicle-side wall and covering the inlet port. The airbag is configured to be inflated in such a fashion that the front portion above the rim portion has a greater thickness than the rear portion in order that a central region of the driver-side wall is deployed generally vertically. The airbag as deployed further includes, in a rear portion of the vehicle-side wall, a locking inflatable portion that protrudes downward from a vicinity of the upper surface of the rim portion to be locked by a rear surface of the rim portion and prevent the front portion of the airbag from slipping forward.

With the airbag device in accordance with the first exemplary embodiment, when the airbag as fully deployed receives the driver moving forward, the vehicle-side wall is likely to slip forward along the upper surface of the rim portion, but the locking inflatable portion catches on and is locked by the rear surface of the rim portion and prevents the vehicle-side wall from moving forward. This enables the central region of the driver-side wall to stay vertically deployed and receive the driver from the head to the thoracic region evenly, i.e. without giving him uneven reaction force. Moreover, although the rim portion has such a shape that the length in the left and right direction is greater than that in the front and back direction and thus a front end portion of the airbag is not directly supported by the rim portion, since the vehicle-side wall does not slip forward along the upper surface of the rim portion, and the front portion of the airbag is configured to be inflated thick, a displacement of the front portion of the airbag will be limited. Therefore, the front portion of the airbag does not collapse forward and is supported by the upper surface of a front end of the rim portion. In the rear portion of the airbag, since an inflated portion adjoining the locking inflatable portion covers a rear end portion of the rim portion, the rear portion of the airbag is supported by the upper surface of the rear end of the rim portion and does not slip forward, thus the abdomen of the driver is prevented from becoming engaged with the rear end portion of the rim portion. Therefore, although the rim portion is short in length in the front and back direction, the airbag is supported by the upper surface of the rim portion steadily and is able to receive the driver moving forward adequately.

In the airbag device for a driver's seat in accordance with the first exemplary embodiment, therefore, despite that the airbag mounted on an odd-shaped steering wheel is configured to have a great thickness in the front portion, the airbag is prevented from slippage by the locking inflatable portion and thus able to restrain and protect the driver adequately.

In order to be brought into contact with the upper surface to a rear surface of the rear end portion of the rim portion, the locking inflatable portion of the airbag as fully deployed may have a shape of such a halved circular cone that a bottom plane faces upward and a division surface, which is taken along a height of the cone, faces forward; and the locking inflatable portion may include, in the side facing forward, a locking surface that is configured to extend from an upper edge to a lower edge of the rear surface of the rim portion and be locked by the lower edge of the rear surface of the rim portion.

This configuration not only restrains the forward slippage of the vehicle-side wall, but also prevents the rear portion of the airbag from floating up at airbag deployment. The locking surface will counteract a moment of force that would act to rotate the front portion of the airbag as has received the driver forward about the mounting seat, thereby preventing the front portion of the airbag from collapsing downward.

The airbag device as described above may be configured such that:

the outer shell of the airbag is composed of a driver-side base cloth for forming the driver-side wall, and a vehicle-side base cloth for forming the vehicle-side wall;

the vehicle-side base cloth includes a front-side component for forming a front region of the vehicle-side wall, and a rear-side component that is connected to a rear portion of the front-side component and includes a region forming the mounting seat;

the rear-side component as developed has a generally circular shape;

the rear-side component includes a rear cut-out portion that is triangular and extends forward from a rear edge of the rear-side component, and two U-shaped cut-out portions that extend towards a center of the rear-side component along a left and right direction from left and right edges of a region of the rear-side component farther rearward than the mounting seat;

opposite edges of the rear cut-out portion are sewn together to close the rear cut-out portion, and opposite edges of each of the U-shaped cut-out portions are sewn together to close the U-shaped cut-out portion with a seam allowance disposed on an outer surface of the airbag; and a straight line that connects outer ends of seams closing the left and right U-shaped cut-out portions is positioned in a vicinity of the rear end portion of the rim portion of the steering wheel at airbag deployment.

With this configuration, the seams that close the left and right U-shaped cut-out portions form a raised portion which is raised by an amount of an opening width of the U-shaped cut-out portions and extends in the left and right direction, in the vehicle-side wall. More specifically, the region in vicinities of outer edges of the seams are pulled rearward by the seam of the rear cut-out portion, whereas a central region located between the left and right U-shaped cut-out portions protrudes forward, thus forming the raised portion. This enables the central region located between the left and right U-shaped cut-out portions to be folded on a region proximate to the mounting seat on a crease which corresponds to the straight line that connects the outer ends of the seams of the U-shaped cut-out portions, in the vehicle-side wall. When the airbag is inflated, a leading end region of the central region between the left and right U-shaped cut-out portions is deployed towards the inlet port or mounting seat underneath the rim portion of the steering wheel. Further, since the straight line that connects the outer ends of the seams closing the left and right U-shaped cut-out portions is positioned in a vicinity of the rear end portion of the rim portion of the steering wheel at airbag deployment, the leading end region of the central region located between the left and right U-shaped cut-out portions is brought into contact with the rear surface to a lower surface of the rear end portion of the rim portion. That is, the leading end region of the central region between the left and right U-shaped cut-out portions forms a top of the locking inflatable portion that catches on and is locked by the lower surface of the rear end portion of the rim portion. A region from the outer ends of the seams closing the left and right U-shaped cut-out portions to the leading end of the central region located between the left and right U-shaped cutout portions forms the locking surface that is locked by the lower surface of the rear end portion of the rim portion. That is, the locking inflatable portion which has a three-dimensional shape of a halved circular cone and includes the locking surface in the front side is formed merely by forming three cut-out portions at predetermined positions in the planar vehicle-side base cloth and closing the same.

The airbag device in accordance with the exemplary embodiment may also be configured such that:

the airbag further includes, at a vicinity of a center in a left and right direction of and inside of a rear end region thereof, at least one long tether and at least one short tether each of which connects the driver-side wall and vehicle-side wall, the long tether being longer than the short tether;

a joint portion of the long tether to the vehicle-side wall and a joint portion of the short tether to the vehicle-side wall are arranged one behind another in the vehicle-side wall;

a joint portion of the long tether to the driver-side wall and a joint portion of the short tether to the driver-side wall are arranged one behind another in the driver-side wall;

the joint portions of the long tether and short tether to the vehicle-side wall are configured to be located in a vicinity of the rear end portion of the rim portion of the steering wheel at airbag deployment;

both of the joint portions of the long tether and short tether to the driver-side wall are located farther rearward than the joint portions of the long tether and short tether to the vehicle-side wall;

in the driver-side wall, the joint portion of the short tether is located farther rearward than that of the long tether;

a distance between the joint portion of the long tether and that of short tether to the driver-side wall is greater than a distance between the joint portion of the long tether and that of the short tether to the vehicle-side wall;

a difference between the lengths of the long tether and short tether, and a difference between the distance between the joint portion of the long tether and that of short tether to the driver-side wall and the distance between the joint portion of the long tether and that of the short tether to the vehicle-side wall help deploy the locking inflatable portion to wrap around the rear end portion of the rim portion from the rear surface to the lower surface and be locked by the rear end portion of the rim portion at airbag deployment.

With this configuration, the locking inflatable portion that is locked by the rear end portion of the rim portion is formed easily by providing two kinds of tethers, i.e. the long tether and short tether, in the rear portion of the airbag. That is, since an area of the driver-side wall between the joint portions of the long and short tethers is greater than an area of the vehicle-side wall between the joint portions of the long and short tethers, the former is inflated more largely than the latter at airbag deployment, and a region of the driver-side wall in a vicinity of the joint portion of the short tether rotates rearward or downward about a region in a vicinity of the joint portion of the short tether to the vehicle-side wall as the airbag is inflated. Thus, the rear end region of the airbag forms the locking inflatable portion that wraps around the rear end portion of the rim portion from the rear surface to the lower surface and is locked by the rear end portion of the rim portion at airbag deployment. With this configuration, the locking inflatable portion is formed merely by providing the long and short tethers in the rear portion of the airbag. Further, this configuration will not increase the volume of the airbag.

In this case, the joint portion of the long tether and the joint portion of the short tether to the vehicle-side wall may be located at a same position. That is, the distance between the joint portions of the long and short tethers in the vehicle-side wall may be zero.

The airbag may be provided with two long tethers and two short tethers. In that case, the two long tethers and the two short tethers may be each arranged at a distance from each other on both sides of a vicinity of the center in the left and right direction of the airbag. This configuration will allow an inflation gas fed via the inlet port located in a vicinity of the center in the front and back direction of the airbag to flow through a space formed between each of the long tethers and short tethers smoothly to the leading end of the locking inflatable portion which is located in the rear end region of the airbag.

In an instance where the airbag is provided with two kinds of long and short tethers, if an outer shell of the airbag is composed of a driver-side base cloth for forming the driver-side wall and a vehicle-side base cloth for forming the vehicle-side wall, the driver-side base cloth may include, in a region farther rearward than a center in a front and back direction of the driver-side base cloth and farther forward than the joint portion of the long tether, a pleated portion that is formed on a plurality of creases which extend in a left and right direction. In that state, the driver-side wall is sewn together with the vehicle-side base cloth by the outer circumferential edges.

With this configuration, due to unfolding of the pleated portion, a film length of the driver-side wall in the front and back direction will lengthen at a vicinity of the center in the left and right direction at airbag deployment, and this will further encourage such a deployment behavior of the locking inflatable portion that wraps around the rear end portion of the rim portion from the rear surface to the lower surface and is tightly locked by the rear end portion of the rim portion by the deployed leading end.

When the airbag is provided with two kinds, i.e. long and short, tethers, the airbag may further include, on an outer surface of a vicinity of a center in a left and right direction of a rear region of the vehicle-side wall, an outer tether that connects a position in a vicinity of a rear end of the vehicle-side wall and a position rearward of the inlet port and forward of the joint portion of the short tether to the vehicle-side wall, a length of the outer tether being such as to bend a rear end region of the vehicle-side wall towards the inlet port when the airbag is inflated by itself.

With the above-described configuration, the outer tether further helps bend the locking inflatable portion such that the locking inflatable portion wraps around the rear end portion of the rim portion of the steering wheel from the rear surface to the lower surface and is locked further tightly by the rear end portion of the rim portion. Moreover, since the outer tether pulls and separates the vehicle-side wall from the driver-side wall in the locking inflatable portion at airbag deployment, an inflation gas will smoothly flow to the leading end of the locking inflatable portion, thereby quickly deploying the locking inflatable portion into such a shape as to be steadily locked by the rear end portion of the rim portion.

The airbag provided with two kinds of long and short tethers may further include a bulkhead that is joined to inner surfaces of the driver-side wall and vehicle-side wall by the outer circumferential edge and divides the airbag into a chamber located towards the rear end of the airbag and a chamber located towards the inlet port. The bulkhead concurrently acts as the long tether, and includes a check valve that permits a flow of inflation gas through it to the rear end of the airbag but restricts a reverse flow.

With this configuration, the bulkhead which concurrently acts as the long tether functions to prevent a drop of internal pressure of the locking inflatable portion by the check valve. Therefore, the locking inflatable portion will keep its fully inflated shape and keep tightly locked by the rear end portion of the rim portion.

What is claimed is:

1. An airbag device for a driver's seat, comprising:
a steering wheel that is adapted to be mounted on a vehicle in such a manner that a central axis of rotation of the steering wheel extends obliquely rearwardly and upwardly, the steering wheel including:
a rim portion configured for gripping, the rim portion being disposed in an outer circumferential edge of the steering wheel apart from the central axis of rotation, the rim portion as viewed from above having such a shape that a length in a left and right direction is greater than a length in a front and back direction; and
a boss section that is disposed in a vicinity of the central axis of rotation; and
the airbag device is mounted on the boss section of the steering wheel for protecting a driver, the airbag device including an airbag that is configured to be deployed from the boss section and supported by an upper surface of the rim portion,
wherein an outer shell of the airbag includes:
a vehicle-side wall that is configured to be supported by the upper surface of the rim portion when deployed, the vehicle-side wall being greater than the rim portion in outside dimension in the front and back direction and in the left and right direction, the vehicle-side wall including, in a vicinity of a center thereof, an inlet port for introducing an inflation gas, and a mounting seat which is disposed in a periphery of the inlet port and by which the airbag is mounted on the boss section; and
a driver-side wall for receiving the driver, the driver-side wall extending from an outer circumferential edge of the vehicle-side wall and covering the inlet port;
wherein the airbag is configured to be inflated in such a fashion that a front portion thereof above the rim portion has a greater thickness than a rear portion thereof in order that a central region of the driver-side wall is deployed generally vertically; and
wherein the airbag as deployed further includes, in a rear portion of the vehicle-side wall, a locking inflatable portion that protrudes downward from a vicinity of the upper surface of the rim portion to be locked by a rear surface of the rim portion and prevent the front portion of the airbag from slipping forward.

2. The airbag device of claim 1, wherein:
in order to be brought into contact with the upper surface to a rear surface of a rear end portion of the rim portion, the locking inflatable portion of the airbag as fully deployed has a shape of such a halved circular cone that a bottom plane faces upward and a division surface, which is taken along a height of the cone, faces forward; and
the locking inflatable portion includes, in a side facing forward, a locking surface that is configured to extend from an upper edge to a lower edge of the rear surface of the rim portion and be locked by the lower edge of the rear surface of the rim portion.

3. The airbag device of claim 2, wherein:
the outer shell of the airbag is composed of a driver-side base cloth for forming the driver-side wall, and a vehicle-side base cloth for forming the vehicle-side wall;
the vehicle-side base cloth includes a front-side component for forming a front region of the vehicle-side wall, and a rear-side component that is connected to a rear portion of the front-side component and includes a region forming the mounting seat;
the rear-side component as developed has a generally circular shape;
the rear-side component includes a rear cut-out portion that is triangular and extends forward from a rear edge of the rear-side component, and two U-shaped cut-out portions that extend towards a center of the rear-side component along a left and right direction from left and right edges of a region of the rear-side component farther rearward than the mounting seat;
opposite edges of the rear cut-out portion are sewn together to close the rear cut-out portion, and opposite edges of each of the U-shaped cut-out portions are sewn together to close the U-shaped cut-out portion with a seam allowance disposed on an outer surface of the airbag; and
a straight line that connects outer ends of seams closing the left and right U-shaped cut-out portions is positioned in a vicinity of the rear end portion of the rim portion of the steering wheel at airbag deployment.

4. The airbag device of claim 1, wherein:
the airbag further includes, at a vicinity of a center in a left and right direction of and inside of a rear end region thereof, at least one long tether and at least one short tether each of which connects the driver-side wall and vehicle-side wall, the long tether being longer than the short tether;
a joint portion of the long tether to the vehicle-side wall and a joint portion of the short tether to the vehicle-side wall are arranged one behind another in the vehicle-side wall;
a joint portion of the long tether to the driver-side wall and a joint portion of the short tether to the driver-side wall are arranged one behind another in the driver-side wall;
the joint portions of the long tether and short tether to the vehicle-side wall are configured to be located in a vicinity of a rear end portion of the rim portion of the steering wheel at airbag deployment;
both of the joint portions of the long tether and short tether to the driver-side wall are located farther rearward than the joint portions of the long tether and short tether to the vehicle-side wall;
in the driver-side wall, the joint portion of the short tether is located farther rearward than that of the long tether;
a distance between the joint portion of the long tether and that of short tether to the driver-side wall is greater than a distance between the joint portion of the long tether and that of the short tether to the vehicle-side wall;
a difference between the lengths of the long tether and short tether, and a difference between the distance between the joint portion of the long tether and that of short tether to the driver-side wall and the distance between the joint portion of the long tether and that of the short tether to the vehicle-side wall help deploy the locking inflatable portion to wrap around the rear end portion of the rim portion from the rear surface to a lower surface and be locked by the rear end portion of the rim portion at airbag deployment.

5. The airbag device of claim 4, wherein the joint portion of the long tether and the joint portion of the short tether to the vehicle-side wall are located at a same position, and thus the distance between the joint portions in the vehicle-side wall is zero.

6. The airbag device of claim 4, wherein:
two long tethers and two short tethers are provided; and
the two long tethers and the two short tethers are each located at a distance from each other on both sides of a vicinity of the center in the left and right direction of the airbag.

7. The airbag device of claim 4, wherein:
the outer shell of the airbag is composed of a driver-side base cloth for forming the driver-side wall, and a vehicle-side base cloth for forming the vehicle-side wall;
the driver-side base cloth includes, in a region farther rearward than a center in a front and back direction of the driver-side base cloth and farther forward than the joint portion of the long tether, a pleated portion that is formed on a plurality of creases which extend in the left and right direction; and
the driver-side base cloth as provided with the pleated portion and the vehicle-side base cloth are sewn together by outer circumferential edges thereof.

8. The airbag device of claim 4, wherein:
the airbag further includes, on an outer surface of a vicinity of a center in a left and right direction of a rear region of the vehicle-side wall, an outer tether that connects a position in a vicinity of a rear end of the vehicle-side wall and a position rearward of the inlet port and forward of the joint portion of the short tether to the vehicle-side wall; and
a length of the outer tether is such as to bend a rear end region of the vehicle-side wall towards the inlet port when the airbag is inflated by itself.

9. The airbag device of claim 4, wherein:
the airbag further includes s a bulkhead that is joined to inner surfaces of the driver-side wall and vehicle-side wall by outer circumferential edge thereof and divides the airbag into a chamber located towards a rear end of the airbag and a chamber located towards the inlet port;
the bulkhead concurrently acts as the long tether; and
the bulkhead includes a check valve that permits a flow of inflation gas through it to the rear end of the airbag but restricts a reverse flow.

* * * * *